(12) United States Patent
Hendriksen et al.

(10) Patent No.: US 12,185,732 B2
(45) Date of Patent: *Jan. 7, 2025

(54) METHOD FOR PRODUCING A DAIRY PRODUCT

(71) Applicant: Kerry Group Services International Ltd., Co. Kerry (IE)

(72) Inventors: Hanne Vang Hendriksen, Holte (DK); Steffen Ernst, Broenshoej (DK); Reinhard Wilting, Farum (DK); Jeppe Wegener Tams, Gentofte (DK); Mette Oerhrstroem Runge, Snekkersten (DK); Helle Skov Guldager, Vedbaek (DK)

(73) Assignee: Kerry Group Services International Ltd, Tralee (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,466

(22) Filed: Oct. 13, 2022

(65) Prior Publication Data

US 2023/0189830 A1   Jun. 22, 2023

Related U.S. Application Data

(63) Continuation of application No. 17/068,015, filed on Oct. 12, 2020, now abandoned, which is a continuation of application No. 16/720,478, filed on Dec. 19, 2019, now abandoned, which is a continuation of application No. 16/380,220, filed on Apr. 10, 2019, now Pat. No. 10,555,541, which is a continuation of application No. 16/021,048, filed on Jun. 28, 2018, now Pat. No. 10,306,902, which is a continuation of application No. 15/433,642, filed on Feb. 15, 2017, now Pat. No. 10,058,107, which is a continuation of application No. 12/744,508, filed as application No. PCT/EP2008/066624 on Dec. 2, 2008, now abandoned.

(60) Provisional application No. 61/055,164, filed on May 22, 2008, provisional application No. 60/992,783, filed on Dec. 6, 2007.

(30) Foreign Application Priority Data

Dec. 3, 2007 (EP) ..................................... 07122110
May 21, 2008 (EP) ..................................... 08156674

(51) Int. Cl.
*C12N 9/38* (2006.01)
*A23C 9/12* (2006.01)
*A23C 9/123* (2006.01)

(52) U.S. Cl.
CPC ............ *A23C 9/1206* (2013.01); *A23C 9/123* (2013.01)

(58) Field of Classification Search
CPC .................................... C12N 9/38; A23C 9/12
See application file for complete search history.

(56) References Cited

U.S. PATENT DOCUMENTS

| | | | |
|---|---|---|---|
| 5,736,374 A | 4/1998 | Berka et al. | |
| 7,081,355 B2 * | 7/2006 | Jorgensen | C12Y 302/01023 426/582 |
| 10,058,107 B2 | 8/2018 | Hendriksen et al. | |
| 10,306,902 B2 * | 6/2019 | Hendriksen | A23C 9/123 |
| 10,555,541 B2 | 2/2020 | Hendriksen et al. | |
| 2008/0286412 A1 | 11/2008 | Dekker et al. | |
| 2017/0156357 A1 | 6/2017 | Hendriksen et al. | |
| 2020/0120946 A1 | 4/2020 | Hendriksen et al. | |

FOREIGN PATENT DOCUMENTS

| | | |
|---|---|---|
| CN | 1652690 A | 8/2005 |
| CN | 1807609 A | 7/2006 |
| CN | 1810161 A | 8/2006 |
| EP | 0026672 A2 | 4/1981 |
| EP | 0119329 A1 | 9/1984 |
| EP | 0323201 A2 | 7/1989 |
| EP | 1283876 B1 | 1/2007 |
| WO | 2001090317 A2 | 11/2001 |
| WO | 2002081673 A1 | 10/2002 |
| WO | 2003094623 A1 | 11/2003 |
| WO | 2007021204 A1 | 2/2007 |
| WO | 2009071539 A1 | 6/2009 |
| WO | 2013182686 A1 | 12/2013 |

OTHER PUBLICATIONS

Anonymous, Asia Pacific Food Industry, 2001, 40-43.
Anonymous, Danisco US, Inc. and DuPont Nutrition Biosciences ApS, Petition for Inter Partes Review of US 10, 058, 107 (IPR2021-00188), 2020.
Anonymous, Danisco US, Inc. and DuPont Nutrition Biosciences ApS, Petition for Inter Partes Review of US 10, 555, 541 (IPR2021-00189), 2020.
Anonymous, Food Ingredients Innovation Awards 17, 2017.
Anonymous, Multiple alignment.
Anonymous, Paranashop announcement re food awards, 2017.
Anonymous, Sequence alignments comparison of BIF1331 without HQ in D27 and D37.
Arla Whey Permeate brochure.
Bornhorst et al., Methods Enzymol., 2000, 245-254, 326.
Breuner, Declaration submitted in an opposition against EP2859098, 2019.
Broome et al., Australian Journal of Dairy Technology, 1983, 35-37, 38(1).
Chr. Hansen, Ha-lactase application sheet, 2010, 1-7.
Clark, Declaration of Douglas S. Clark submitted in IPR 2021-00188, 2020, 1-106.
Clark, Declaration of Douglas S. Clark submitted in IPR 2021-00189, 2020, 1-106.

(Continued)

Primary Examiner — Tekchand Saidha
(74) Attorney, Agent, or Firm — Knobbe, Martens, Olson & Bear, LLP

(57) ABSTRACT

The present invention relates to a method for producing a dairy product using an enzyme having lactase activity.

20 Claims, No Drawings

Specification includes a Sequence Listing.

(56) References Cited

OTHER PUBLICATIONS

Cruz et al., Revista de Microbiologia, 1999, 265-271, 30.
De Vrese et al., Am J Clin Nutr, 2001, 421-429, 73.
Dechter et al., Food Biotechnology, 1998, 73-89, 12.
Dumortier et al., Biotechnol. Appl. Biochem., 1994, 341-354, 19.
EP2234501 and Uniprotkb access No. U2C011 sequence alignment.
Giessing, Declaration submitted in an opposition against EP2859098, 2019.
Goulas et al., Appl Microbiol Biotechnol, 2007, 1365-1372, 76(6).
Goulas et al., UniProt Access No. A4K5H9, 2007.
Hussein et al., Journal of Food Protection, 1988, 30-34, 52(1).
Ismail et al., Journal of Society of Dairy Technology, 1983, 52-55, 36(2).
Joergensen et al., Appl Microbiol Biotechnol, 2001, 647-652, 57.
Jurado et al., Enzyme and Microbial Technology, 2004, 33-40, 34.
Kang et al., Enzyme and Microbial Technology, 2005, 655-662, 37.
Kenward, Food Ingredients, 2016, 1-2.
Ma et al., Science and Technology of Food Industry, 2002, 50-52.
Ma et al., Science and Technology of Food Industry, 2002, 50-52,—Translation.
Madsen et al., UniProt Access No. Q9F4D5, 2003.
Mahoney et al., Journal of Food Science, 1978, 584-591, 43.
Marchler-Bauer, NCBI Accession No. CAC14566.2, 2004.
Martinez-Villaluenga et al., Food Chemistry, 2008, 258-264, 107(1).
Moeller et al., Applied and Environmental Microbiology, 2001, 2276-2283, 67(5).
Myers et al., UniProt Access No. Q0TR23, 2006.
Novozymes, Application Sheet Lactose Reduction, 2009, 1-7.
Passerat et al., Nutrition Research, 1995, 1287-1295, 15(9).
Rao, Food Science and Technology International, 1997, 87-92, 3.
Rubio-Texeira, Biotechnology Advances, 2006, 212-225, 24.
Shimizu et al., UniProt Access No. Q8XKX6, 2002.
Sudarsanam et al., UniProt Access No. A5KPK7, 2007.
Tamm, Scand J Gastroentero, 1994, 55-63.
WO2001090317A2 and EP2234501 Sequence comparison.
WO2001090317A2 and EP2234501 Sequence comparison 2.
Anonymous, Food Ingredients South America Innovation Awards (2017).
Anonymous, Food Ingredients Innovation Awards, "Novozymes is Finalist of the Fi Innovation Awards 2017 with Saphera" (2017).
Anonymous, Sequence Alignment between Amino Acid Sequences Disclosed in EP 2234501 and WO 01/90317 (date unknown).
Anonymous, Alignment of BIF 1331 with QH-tag, BIF 1331 without QH-tag, and Seq ID No. 2 of EP 2234501 (date unknown).
Anonymous, Alignment of BIF-1331 without HA (date unknown).
Anonymous, Alignment of Seq ID No. 2 of EP 2234 501 and B. bifidum ATCC 29521 (UniProtKB Acession No. U2CO11) (date unknown).
Kenward, "Novozymes: Saphera Enables New Innovation in Lactose-Free, Fermented Dairy Products" (2016).
Madsen et al., GenBank Accession CAC14566.2 (2003).

\* cited by examiner

SEQUENCE LISTING

```
Sequence total quantity: 7
SEQ ID NO: 1            moltype = AA  length = 1931
FEATURE                 Location/Qualifiers
source                  1..1931
                        mol_type = protein
                        organism = Bifidobacterium bifidum
SEQUENCE: 1
MKKPLGKIVA STALLISVAF SSSIASAAVE DATRSDSTTQ MSSTPEVAYS SAVDSKQNRT   60
SDFDANWKFM LSDSVQAQDP AFDDSAWQQV DLPHDYSITQ KYSQSNEAES AYLPGGTGWY  120
RKSFTIDRDL AGKRIAINFD GVYMNATVWF NGVKLGTHPY GYSPFSFDLT GNAKFGGENT  180
IVVKVENRLP SSRWYSGSGI YRDVTLTVTD GVHVGNNGVA IKTPSLATQN GGDVTMNLTT  240
KVANDTEAAA NITLKQTVFP KGGKTDAAIG TVTTASKSIA AGASADVTST ITAASPKLWS  300
IKNPNLYTVR TEVLNGGKVL DTYDTEYGFR WTGFDATSGF SLNGEKVKLK GVSMHHDQGS  360
LGAVANRRAI ERQVEILQKM GVNSIRTTHN PAAKALIDVC NEKGVLVVEE VFDMWNRSKN  420
GNTEDYGKWF GQAIAGDNAV LGGDKDETWA KFDLTSTINR DRNAPSVIMW SLGNEMMEGI  480
SGSVSGFPAT SAKLVAWTKA ADSTRPMTYG DNKIKANWNE SNTMGDNLTA NGGVVGTNYS  540
```

```
DGANYDKIRT THPSWAIYGS ETASAINSRG IYNRTTGGAQ SSDKQLTSYD NSAVGWGAVA    600
SSAWYDVVQR DFVAGTYVWT GFDYLGEPTP WNGTGSGAVG SWPSPKNSYF GIVDTAGFPK    660
DTYYFYQSQW NDDVHTLHIL PAWNENVVAK GSGNNVPVVV YTDAAKVKLY FTPKGSTEKR    720
LIGEKSFTKK TTAAGYTYQV YEGSDKDSTA HKNMYLTWNV PWAEGTISAE AYDENNRLIP    780
EGSTEGNASV TTTGKAAKLK ADADRKTITA DGKDLSYIEV DVTDANGHIV PDAANRVTFD    840
VKGAGKLVGV DNGSSPDHDS YQADNRKAFS GKVLAIVQST KEAGEITVTA KADGLQSSTV    900
KIATTAVPGT STEKTVRSFY YSRNYYVKTG NKPILPSDVE VRYSDGTSDR QNVTWDAVSD    960
DQIAKAGSFS VAGTVAGQKI SVRVTMIDEI GALLNYSAST PVGTPAVLPG SRPAVLPDGT   1020
VTSANFAVHW TKPADTVYNT AGTVKVPGTA TVFGKEFKVT ATIRVQRSQV TIGSSVSGNA   1080
LRLTQNIPAD KQSDTLDAIK DGSTTVDANT GGGANPSAWT NWAYSKAGHN TAEITFEYAT   1140
EQQLGQIVMY FFRDSNAVRF PDAGKTKIQI SADGKNWTDL AATETIAAQE SSDRVKPYTY   1200
DFAPVGATFV KVTVTNADTT TPSGVVCAGL TEIELKTATS KFVTNTSAAL SSLTVNGTKV   1260
SDSVLAAGSY NTPAIIADVK AEGEGNASVT VLPAHDNVIR VITESEDHVT RKTFTINLGT   1320
EQEFPADSDE RDYPAADMTV TVGSEQTSGT ATEGPKKFAV DGNTSTYWHS NWTPTTVNDL   1380
WIAFELQKPT KLDALRYLPR PAGSKNGSVT EYKVQVSDDG TNWTDAGSGT WTTDYGWKLA   1440
EFNQPVTTKH VRLKAVHTYA DSGNDKFMSA SEIRLRKAVD TTDISGATVT VPAKLTVDRV   1500
DADHPATFAT KDVTVTLGDA TLRYGVDYLL DYAGNTAVGK ATVVRGIDK YSGTVAKTFT    1560
IELKNAPAPE PTLTSVSVKT KPSKLTYVVG DAFDPAGLVL QLNYDDDSTG TVTWNTQTAG   1620
DPTFKPALDA KLKVTDKTVT VTYQGKSAVI DITVSQPAPT VSKTDLDKAI KAIEAKNPDS   1680
SKYTADSWKT FADAMAHAKA VIADDSATQQ DVDNALKALT DAYAGLTEKT PEPAPVSKSE   1740
LDKKIKAIEA EKLDGSKYTA ESWKAFETAL AHAKAVIASD SATQQNVDAA LGALTSARDG   1800
LTEKGEVKPD PKPEPGTVDK AALDKAVKKV EAEKLDGSKY TADSWKAFET ALAHAKAVIG   1860
NANSTQFDID NALSMLNDAR AALKEKPGRI IAIIDGSALS KTGASVAIIA SVAAAMLAVG   1920
AGVMALRRKR S                                                       1931

SEQ ID NO: 2            moltype = AA   length = 1341
FEATURE                 Location/Qualifiers
source                  1..1341
                        mol_type = protein
                        organism = Bifidobacterium bifidum
SEQUENCE: 2
MKKPLGKIVA STALLISVAF SSSIASAIED ATRSDSTTQM SSTPEVAYSS AVDSKQNRTS    60
DFDANWKFML SDSVQAQDPA FDDSAWQQVD LPHDYSITQK YSQSNEAESA YLPGGTGWYR   120
KSFTIDRDLA GKRIAINFDG VYMNATVWFN GVKLGTHPYG YSPFSFDLTG NAKFGGENTI   180
VVKVENRLPS SRWYSGSGIY RDVTLTVTDG VHVGNNGVAI KTPSLATQNG GDVTMNLTTK   240
VANDTEAAAN ITLKQTVFPK GGKTDAAIGT VTTASKSIAA GASADVTSTI TAASPKLWSI   300
KNPNLYTVRT EVLNGGKVLD TYDTEYGFRW TGFDATSGFS LNGEKVKLKG VSMHHDQGSL   360
GAVANRRAIE RQVEILQKMG VNSIRTTHNP AAKALIDVCN EKGVLVVEEV FDMWNRSKNG   420
NTEDYGKWFG QAIAGDNAVL GGDKDETWAK FDLTSTINRD RNAPSVIMWS LGNEMMEGIS   480
GSVSGFSATS AKLVAWTKAA DSTRPMTYGD NKIKANWNES NTMGDNLTAN GGVVGTNYSD   540
GANYDKIRTT HPSWAIYGSE TASAINSRGI YNRTTGGAQS SDKQLTSYDN SAVGWGAVAS   600
SAWYDVVQRD FVAGTYVWTG FDYLGEPTPW NGTGSGAVGS WPSPKNSYFG IVDTAGFPKD   660
TYYFYQSQWN DDVHTLHILP AWNENVVAKG SGNNVPVVVY TDAAKVKLYF TPKGSTEQRL   720
IGEKSFTKKT TAAGYTYQVY EGSDKDSTAH KNMYLTWNVP WAEGTISAEA YDENNRLIPE   780
GSTEGNASVT TTGKAAKLKA DADRKTITAD GKDLSYIEVD VTDANGHIVP DAANRVTFDV   840
KGAGKLVGVD NGSSPDHDSY QADNRKAFSG KVLAIVQSTK EAGEITVTAK ADGLQSSTVK   900
IATTAVPGTS TEKTVRSFYY SRNYYVKTGN KPILPSDVEV RYSDGTSDRQ NVTWDAVSDD   960
QIAKAGSFSV AGTVAGQKIS VRVTMIDEIG ALLNYSASTP VGTPAVLPGS RPAVLPDGTV  1020
TSANFAVHWT KPADTVYNTA GTVKVPGTAT VFGKEFKVTA TIRVQRSQVT IGSSVSGNAL  1080
RLTQNIPADK QSDTLDAIKD GSTTVDANTG GGANPSAWTN WAYSKAGHNT AEITFEYATE  1140
QQLGQIVMYF FRDSNAVRFP DAGKTKIQIS ADGKNWTDLA ATETIAAQES SDRVKPYTYD  1200
FAPVGATFVR VTVTNADTTT PSGVVCAGLT EIELKTATSK FVANTSAALS SLTVNGTKVS  1260
DSVLAAGSYN TPAIIADVKA EGEGNASVTV LPAHDNVIRV ITESEDHVTR KTFTINLGTE  1320
QEFPADSDER DQHQHQHQHQ Q                                           1341

SEQ ID NO: 3            moltype = AA   length = 1752
FEATURE                 Location/Qualifiers
source                  1..1752
                        mol_type = protein
                        organism = Bifidobacterium bifidum
SEQUENCE: 3
MAVRRLGGRI VAFAATVALS IPLGLLTNSA WAVEDATRSD STTQMSSTPE VVYSSAVDSK    60
QNRTSDFDAN WKFMLSDSVQ AQDPAFDDSA WQQVDLPHDY SITQKYSQSN EAESAYLPGG   120
TGWYRKSFTI DRDLAGKRIA INFDGVYMNA TVWFNGVKLG THPYGYSPFS FDLTGNAKFG   180
GENTIVVKVE NRLPSSRWYS GSGIYRDVTL TVTDGVHVGN NGVAIKTPSL ATQNGGDVTM   240
NLTTKVANDT EAAANITLKQ TVFPKGGKTD AAIGTVTTAS KSIAAGASAD VTSTITAASP   300
KLWSIKNPNL YTVRTEVLNG GKVLDTYDTE YGFRWTGFDA TSGFSLNGEK VKLKGVSMHH   360
DQGSLGAVAN RRAIERQVEI LQKMGVNSIR TTHNPAAKAL IDVCNEKGVL VVEEVFDMWN   420
RSKNGNTEDY GKWFGQAIAG DNAVLGGDKD ETWAKFDLTS TINRDRNAPS VIMWSLGNEM   480
MEGISGSVSG FPATSAKLVA WTKAADSTRP MTYGDNKIKA NWNESNTMGD NLTANGGVVG   540
TNYSDGANYD KIRTTHPSWA IYGSETASAI NSRGIYNRTT GGAQSSDKQL TSYDNSAVGW   600
GAVASSAWYD VVQRDFVAGT YVWTGFDYLG EPTPWNGTGS GAVGSWPSPK NSYFGIVDTA   660
GFPKDTYYFY QSQWNDDVHT LHILPAWNEN VVAKGSGNNV PVVVYTDAAK VKLYFTPKGS   720
TEKRLIGEKS FTKKTTAAGY TYQVYEGSDK DSTAHKNMYL TWNVPWAEGT ISAEAYDENN   780
RLIPEGSTEG NASVTTTGKA AKLKADADRK TITADGKDLS YIEVDVTDAN GHIVPDAANR   840
VTFDVKGAGK LVGVDNGSSP DHDSYQADNR KAFSGKVLAI VQSTKEAGEI TVTAKADGLQ   900
SSTVKIATTA VPGTSTEKTV RSFYYSRNYY VKTGNKPILP SDVEVRYSDG TSDRQNVTWD   960
AVSDDQIAKA GSFSVAGTVA GQKISVRVTM IDEIGALLNY SASTPVGTPA VLPGSRPAVL  1020
PDGTVTSANF AVHWTKPADT VYNTAGTVKV PGTATVFGKE FKVTATIRVQ RSQVTIGSSV  1080
```

```
SGNALRLTQN IPADKQSDTL DAIKDGSTTV DANTGGGANP SAWTNWAYSK AGHNTAEITF 1140
EYATEQQLGQ IVMYFFRDSN AVRFPDAGKT KIQISADGKN WTDLAATETI AAQESSDRVK 1200
PYTYDFAPVG ATFVKVTVTN ADTTTPSGVV CAGLTEIELK TATSKFVTNT SAALSSLTVN 1260
GTKVSDSVLA AGSYNTPAII ADVKAEGEGN ASVTVLPAHD NVIRVITESE DHVTRKTFTI 1320
NLGTEQEFPA DSDERDYPAA DMTVTVGSEQ TSGTATEGPK KFAVDGNTST YWHSNWTPTT 1380
VNDLWIAFEL QKPTKLDALR YLPRPAGSKN GSVTEYKVQV SDDGTNWTDA GSGTWTTDYG 1440
WKLAEFNQPV TTKHVRLKAV HTYADSGNDK FMSASEIRLR KAVDTTDISG ATVTVPAKLT 1500
VDRVDADHPA TFATKDVTVT LGDATLRYGV DYLLDYAGNT AVGKATVTVR GIDKYSGTVA 1560
KTFTIELKNA PAPEPTLTSV SVKTKPSKLT YVVGDAFDPA GLVLQHDRQA DRPPQPLVGE 1620
QADERGLTCG TRCDRVEQLR KHENREAHRT GLDHLEFVGA ADGAVGEQAT FKVHVHADQG 1680
DGRHDDADER DIDPHVPVDH AVGELARAAC HHVIGLRVDT HRLKASGFQI PADDMAEIDR 1740
ITGFHRFERH VG                                                  1752

SEQ ID NO: 4           moltype = AA   length = 1935
FEATURE                Location/Qualifiers
source                 1..1935
                       mol_type = protein
                       organism = Bifidobacterium bifidum
SEQUENCE: 4
MAVRRLGGRI VAFAATVALS IPLGLLTNSA WAVEDATRSD STTQMSSTPE VVYSSAVDSK 60
QNRTSDFDAN WKFMLSDSVQ AQDPAFDDSA WQQVDLPHDY SITQKYSQSN EAESAYLPGG 120
TGWYRKSFTI DRDLAGKRIA INFDGVYMNA TVWFNGVKLG THPYGYSPFS FDLTGNAKFG 180
GENTIVVKVE NRLPSSRWYS GSGIYRDVTL TVTDGVHVGN NGVAIKTPSL ATQNGGNVTM 240
NLTTKVANDT KAAANITLKQ TVFPKGGKTD AAIGTVTTAS KSIAAGASAD VTSTITAASP 300
KLWSIKNPNL YTVRTEVLNG GKVLDTYDTE YGFRWTGFDA TSGFSLNGEK VKLKGVSMHH 360
DQGSLGAVAN RRAIERQVEI LQKMGVNSIR TTHNPAAKAL IDVCNEKGVL VVEEVFDMWN 420
RSKNGNTEDY GKWFGQAIAG DNAVLGGDKD ETWAKFDLTS TINRDRNAPS VIMWSLGNEM 480
MEGISGSVSG FPATSAKLVA WTKAADSTRP MTYGDNKIKA NWNESNTMGD NLTANGGVVG 540
TNYSDGANYD KIRTTHPSWA IYGSETASAI NSRGIYNRTT GGAQSSDKQL TSYDNSAVGW 600
GAVASSAWYD VVQRDFVAGT YVWTGFDYLG EPTPWNGTGS GAVGSWPSPK NSYFGIVDTA 660
GFPKDTYYFY QSQWNDDVHT LHILPAWNEN VVAKGSGNNV PVVVYTDAAK VKLYFTPKGS 720
TEKRLIGEKS FTKKTTAAGY TYQVYEGADK DSTAHKNMYL TWNVPWAEGT ISAEAYDENN 780
RLIPEGSTEG NASVTTTGKA AKLKADADRK TITADGKDLS YIEVDVTDAN GHIVPDAANR 840
VTFDVKGAGK LVGVDNGSSP DHDSYQADNR KAFSGKVLAI VQSTKEAGEI TVTAKADGLQ 900
SSTVKIATTA VPGTSTEKTV RSFYYSRNYY VKTGNKPILP SDVEVRYSDG TSDRQNVTWD 960
AVSDDQIAKA GSFSVAGTVA GQKISVRVTM IDEIGALLNY SASTPVGTPA VLPGSRPAVL 1020
PDGTVTSANF AVDWTKPADT VYNTAGTVKV PGTATVFGKE PKVTATIRVQ RSQVTIGSSV 1080
SGNALRLTQN IPADKQSDTL DAIKDGSTTV DANTGGGANP SAWTNWAYSK AGHNTAEITF 1140
EYATEQQLGQ IVMYFFRDSN AVRFPDAGKT KIQISADGKN WTDLAATETI AAQESSDRVK 1200
PYTYDFAPVG ATFVKVTVTN ADTTTPSGVV CAGLTEIELK TATSKFVTNT SAALSSLTVN 1260
GTKVSDSVLA AGSYNTPAII ADVKAEGEGN ASVTVLPAHD NVIRVITESE DHVTRKTFTI 1320
NLGTEQEFPA DSDERDYPAA DMTVTAGSEQ TSGTATEGPK KFAVDGNTST YWHSNWTPTT 1380
VNDLWIAFEL QKPTKLDALR YLPRPAGSKN GSVTEYKVQV SDDGTNWTDA GSGTWTTDYG 1440
WKLAEFNQPV TTKHVRLKAV HTYADSGNDK FMSASEIRLR KAVDTTDISG ATVTVPAKLT 1500
VDRVDADHPA TFATKDVTVT LGDATLRYGV DYLLDYAGNT AVGKATVTVR GIDKYSGTVA 1560
KTFTIELKNA PAPEPTLTSV SVKTKPSKLT YVVGDAFDPA GLVLQNYDD DSTGTVTWNT 1620
QTAGDFTFKP ALDAKLVTD KTVTVTYQGK SAVIDITVSQ PAPTVSKTDL DKAIKAIEAK 1680
NPDSSKYTAD SWKTFADAMA HAKAVIADDS ATQQDVDKAL KALTDAYAGL TEKTPEPAPV 1740
SKSELDKKIK AIEAEKLDGS KYTAESWKAF ETALAHAKAV IASDSATQQD VDAALGALTS 1800
ARDGLTEKGE VKPDPKPEPG TVDKAALDKA VKKVEAEKLD GSKYTADSWK AFETALAHAK 1860
AVIGNANSTQ FDIDNALSML NDARAALKEK PGRIIAIIDG GALSKTGASV AIIASVAAAM 1920
KAVGAGVMAL RPPKW                                               1935

SEQ ID NO: 5           moltype = AA   length = 2021
FEATURE                Location/Qualifiers
source                 1..2021
                       mol_type = protein
                       organism = Ruminococcus torques
SEQUENCE: 5
MKNLKWKKAG SAVLATALAG SMVLPATAYA QGEIVQLEGG TSTQTNTAPE QVFLNKYSGT 60
VRTQNFNDNW KFYLGDASGA QTPAFDDSSW DQVNLPHDYS IDQKYSQKME AESGYLPGGT 120
GWYRKNFTVD ESLKGKRISI DFGGVYMNAT IYVNGKKLGT HPNGYTPFSF DITDNVKFGK 180
ENVIAVKVDH QTPSSRFYSG SGIYRDVDFV VTDTVHVDKN GTKIETPDLK DHADGNNVAV 240
KVKTTVVNES ENNASVKVKH TIYPKNGTAE QAVGTFETEV ATVDKGKSKD VQADFTVSGV 300
KLWSTTTPNL YTVKTEVLMD GTTVDTYETD YGFRYDFNN NTGFSLNGQK MKLQGVCMHH 360
DQGALGSVAN DRSTERQVEI LKMMGCNSIR VTHNPASDEL IDACNKHGIL VIDEAFDGWV 420
APKNSNSNDY SKWFNKKIED GNEIMGAAEN MTWAQFDLTA MIERGQNDPA IIMWSLGNEM 480
WEGTGGYSDD YKTAQDNLVK WAKAADTTRP VTTGDNKLKS NETGAITLGQ ELQKAGGIHG 540
MNYSQEWKNH AGKTHYDMIH EAYPEWCMYG SETASAVNSR GIYKGMGSQT DYGDYDLTSY 600
DTSAVGWGAT ASSAWYEVIK RDFIAGEYVW TGFDYIGEPT PWNGTGQKP GNASRWPAPK 660
SSYFGIVDTA GLPKDSYYFY QSQWNDSVNT LHILPAWNEE VVYKKSGNDV PVVVYSDAKK 720
VELFFFTPASG GEQRSLGAKE FTEKKTTAGY TYQMYEGTGK SNTEHENLYM TWMVPYEAGT 780
ITAKAWDKDG KEITENLQGR TSVTTAGEAK KLKVDVDRTK ITANGEDLSY LTVSVTDDKG 840
NLVPNADNKV TFEVSGDGVL AGVDNGRPVD HQSYRDDNRK AFSGQLVGIV QSTKSAGTIT 900
VKVKAEGMED QTVTITTTPS SDSSESKKAI SSVKMSKSYY VKVGNQPQLP GQVEVVLTDK 960
TKTTGTVTWE KATAEQIGQA GTFSLTGTVS VEGVEKAETV SVNVNMIDTV AALLNYSTTT 1020
SVGVAPSLPT SRPAVMEDGT VLTAAFPVKW EAPEKGYDAE GIVNVTGTAD VFGESMPVTA 1080
TVRVQEAEYT VGNNVAKEAM TLSQDIPQEM QSDDLEAIRD GNRTVDGNQG GNTNSTMWSN 1140
YKNSKDAKDN DADITFQYAT QQIFNQIKIF FRSDSHAASY PADNTTKIYV SETGEEGTWT 1200
```

```
EVTATESHPE ELPAIGVVEY TYDFVPTKAV FVKIHVVNNP DASGKGGGFT CTGIVEAELY    1260
LANQADFTTN TTAKLESLKI NETSAPAEVL AAGAGSWGTK EVEAKTVEAV GADNAAVTVL    1320
PTYENAVRII IESEDHKTTN TFVVNLDADA TDDSKDYDKA KITSTVGSAQ SGNEKEKAFD    1380
GDTNTLWHTQ WNNTNPAERW IEMELEDVQN VIGLRYLPRQ NGGQNGIVKT YKIEVKAAEG    1440
DEWKEVAVTE GTKVWAVDNT WKMAKFETPV QAKYIRFSGV ETHDDQGGNK WMSAAEIRVK    1500
VTKEEVVPPT ATELSLKAQP TKTAYAVGEK FDPAGLVIGV KYSDGTEKEV AYGQDNAGEF    1560
TFNPTLSTAL TKDYTKVEVG YAGLKLDVNI TVSESEPVIP EALEVVSAPA KTEYEEGEMF    1620
NPAGLSVKIK YSDGSYGDEV AYGTANADQF TFNPTLDTAL KTSDEKVTVT YAEKTADIKI    1680
KVNKKTPVVP ENPTVEKVEI KANPAKTEYK EGDKFDPTGL VLTVKYDKGE DKEVAYGDAT    1740
KADFTFIPSL DTALKTSDEK VTVTYAGKTA EIGIEVKADT PVEPEKPTVD KIAVKKVPAK    1800
TTYKAGETFD PSGLVLTVTM SDKTTKEVAY GNETAKDFVF NPTLDTALTE GMNKVDVTYA    1860
GKTVDIGIEV KADTPVEPEK PTVEKVEIKA NPAKTEYKAG ETFDPTGMSL TVTMSDGTTK    1920
VVAYGPETAK DFSFNPSLNT KLTADTKKVT VTYGGQSADV AVSVKADPSE DKKPNTEKPD    1980
KGGAVQTGDN FNVTLLIGLV VLAGAVAGGA ALTIFKRNKR K                       2021

SEQ ID NO: 6        moltype = AA   length = 1355
FEATURE             Location/Qualifiers
source              1..1355
                    mol_type = protein
                    organism = Clostridium perfringens
SEQUENCE: 6
MQSFNKRGTA LGAAIAFALT LAPTLVMAET RQIPESETVN VGFIKDGERS TIFNQNWKFF      60
KGDPSGAEGV DFDDSSWRGL NLPHDWSIEG DFTVEGEAES GFLLGGTGWY RKAFVVPEKY     120
NSKDFTLNFD GVYMNAEVYV NGKKVGEHNY GYTSFAFDIT EALICDGQTE NIIAVKVSNP    180
VPTSRWYSGS GIYRDVTLSV TDSIHVAHSG TTVTTPKLEE QKGGDVDVAI ETIVENESKD    240
NSMVTVKSTV VNSKGEEVSE AVINEQSIGV NESYTFKQTA IVNNPDLWSV DNPNMYKVKS    300
EVLLDGKVID TYFTDFGFRY YNFDKDTGFS LNGENMKLKG VCMHHDQGAL GAASYYRAVE    360
RQMEKMKEMG VNAIRVSHNP ASEMLLEICN RLGLLVINEA FDTWTNPKNG NVNDFSKYFN    420
EVIGEDNEIL NGSPEMTWGE FEARSMVKNS KNNPSIIMWS IGNEVLEGIS GSASNYTNVA    480
QNIIDWIKDE DETRHVTIGD NRTKNGDRTA EAISEVVDDN GGLVGFNYAN ETQVAQQRAN    540
HPDWTLYASE TSSAIHTRGY YKTKGIDYGN HRISEYDNNQ TKVGWGHSAS DAWKFVIKND    600
YNAGELVWTG FDYIGEPTPW NGTGTGTVGG GNGAAPKSSY FGIVDTAGFE KDIYYLYQSQ    660
WNDDVNTLHV LPTWNREDIV IENGNVEVNN FTDAHKVELY LNDKKVGEQT STEHTTDAGY    720
KYYTFGNDSL YPVFNVPYEE GTLTAKAYDK EGNEITNTEG RNTVKTTGEA STVRLSADRD    780
TIDSDGYDLS YITVDIVDED GNIVQNADNR LNFQLEGDGK IVDVDNGDQT DTDSYKPTSD    840
TEASRKALSG KALVIVQSTK DAGNIRLNVS GEGLQSQSIE INTVNNAGED KFLESYEIVK    900
DYYVNLNEKP ELPSTVEGRY SDGTTETFNI SWNDYDESQL NTPQVFKING KLEGTDVAVN    960
VNVHVIGDVV SMENYSTFTY AGQTPTLPKT VKGYLADGNE SEEFKVDWNL EGVDFSEPNT   1020
TVEVLGEVSL LGKTYTVTST VRVVEALKAA ANLAINNSSN KDVPALSQSC VSTADNLNSI   1080
NNGITNNSSN TGERWTNWNE RNLTENGEPK GAYVQLDWKN KYNIDRLDLW LFTDNIYGRI   1140
PKKVEISYKN EAGEYEVVTH SNTTEVSYLA GETTYFLDKV INTDSIRVYM QQPEVGKCIG   1200
LSEVAVYEYV PQVSANEGNK LSEIKLDGEA LEGFNPDTNE YTVNLKELPK TVEASGEENV   1260
AITILPVHNN KSIIIARSES GAKNIYTVNY VLEESEGSAD INEDGSINVG DLSIVSKYQG   1320
EVISGNALSE KSDINKDGVV DKADIQIVMG KILGE                             1355

SEQ ID NO: 7        moltype = AA   length = 1355
FEATURE             Location/Qualifiers
source              1..1355
                    mol_type = protein
                    organism = Clostridium perfringens
SEQUENCE: 7
MQSFNKRGTA LGAAIAFALT LAPTLVMAET RQIPESETVN VGFIKDGERS TIFNQNWKFF      60
KGDPSGAEGV DFDDSSWRGL NLPHDWSIEG DFTVEGEAES GFLLGGTGWY RKAFVVPEKY     120
NGKDFTLNFD GVYMNAEVYV NGKKVGEHNY GYTSFAFDIT EALICDGQTE NIIAVKVSNP    180
VPTSRWYSGS GIYRDVTLSV TDSIHVAHAG TTVTTPKLEE QKDGDVDVAI ETIVENESKD    240
NSMVTVKSTV VNSKGEEVSE SVINEKSIGA NESYTFNQTA IVNNPGLWSV DNPNMYKVKS    300
EVLVDGNVID TYFTDFGFRY YNFDKDTGFS LNGENIKLKG VCMHHDQGAL GAASYYRAVE    360
RQMEKMKEMG VNAIRVSHNP ASEMLLEICN RLGLLVINEA FDTWTNPKNG NVNDFSKYFN    420
EVIGEDNEIL NGSPEMTWGE FEARSMVKNS KNNPSIIMWS IGNEVLEGIS GSASNYTNVA    480
QNIIDWIKDE DETRHVTIGD NRTKNGDRTA EAISEVVDDN DGLVGFNYAN EAQVAQQRAN    540
HPDWTLYASE TSSAIHTRGY YKTKGIDYSN HRISEYDNNQ TKVGWGHSAS DAWKFVIKND    600
YNAGEFVWTG FDYIGEPTPW NGTGTGTVGG GNGAAPKSSY FGIVDTAGFE KDIYYLYQSQ    660
WNDDVNTLHV LPTWNREDIV IENGNVEVNN FTDAHKVELY LNDEKIGEQT STEHTTDAGY    720
KYYTFGNDSL YPVFNVPYKE GTLTARAYDK EGNEITNTEG RNTVKTTGEA STVRLSADRD    780
TIDSDGYDLS YITVDIVDEN GNIVQNADNR LNFELEGNGK IVGVDNGDQT DTDSYKPTSD    840
TEASRKALSG KALVIVQSTK DAGNIRLNVS GEGLQSQSIE INTVNNAGED KFLESYEIVK    900
DYYVNLNEKP ELPSTVEGRY SDGTTETFNI SWNDYDESQL NTPQVFKING KLEGTDVAVN    960
VNVHVIGDVV SMENYSTFTY AGQTPTLPKT VKGYLADGNE SEEFKVDWNL EGVDFSEPNT   1020
TVEVLGEVSL LGKTYTVTST VRVVEALKAA ANLAINKDTN KDVPALSQSC VSQADNLNSI   1080
NNGITNNGTD TRERWTNWNE RDLTVNGEPK GAYVQLDWEN KYNIDRLDLW LFTDNIYGRI   1140
PKKVEISYKN EAGEYEVVTH SNTTEVSYLA GETTYFLDKV INTDSIRVYM QQPEVGKCIG   1200
LSEVAVYEYV PQVSANEGNK LSEIKLDGEA LEGFNPDTNE YTVNLKELPK TVEASGEENV   1260
AITILPVHNN KSIIIARSES GAKNIYTVNY VLEESEGSAD INEDGSINVG DLSIVSKYQG   1320
EIISGNALSE KSDINKDGVV DKADIQIVMG KILGE                             1355
```

METHOD FOR PRODUCING A DAIRY PRODUCT

CROSS-REFERENCE TO RELATED APPLICATIONS

This application is a continuation of U.S. application Ser. No. 17/068,015, filed on Oct. 12, 2020, (now pending) which is a continuation of U.S. application Ser. No. 16/720,478 filed Dec. 19, 2019, (now abandoned), which is a continuation of U.S. application Ser. No. 16/380,220 filed Apr. 10, 2019, now U.S. Pat. No. 10,555,541, which is a continuation of U.S. application Ser. No. 16/021,048 filed on Jun. 28, 2018, now U.S. Pat. No. 10,306,902, which is a continuation of U.S. Ser. No. 15/433,642 filed Feb. 15, 2017, now U.S. Pat. No. 10,058,107, which is a continuation of U.S. application Ser. No. 12/744,508 filed Jul. 7, 2010, now abandoned, which is a 35 U.S.C. 371 national application of PCT/EP2008/066624 filed Dec. 2, 2008, which claims priority or the benefit under 35 U.S.C. 119 of European application nos. 07122110.5 and 08156674.7 filed Dec. 3, 2007 and May 21, 2008, respectively, and U.S. provisional application Nos. 61/055,164 and 60/992,783 filed May 22, 2008 and Dec. 6, 2007, respectively. The content of each application is fully incorporated herein by reference.

SEQUENCE LISTING

The present invention comprises a sequence listing, which is incorporated herein by reference. The name of the file containing the Sequence Listing is SQ.XML, which was created on Oct. 10, 2022 and has 18.3 KB.

TECHNICAL FIELD

The present invention relates to a method for producing a dairy product using an enzyme having lactase activity.

BACKGROUND OF THE INVENTION

Lactose intolerance is perhaps the best-known food sensitivity in the United States and other parts of the world. It is estimated that about 70% of the world's population has a genetically controlled limited ability to digest lactose. Therefore, to help dairy maldigesters keep dairy foods in their diet, there is a growing demand for dairy food products that contain no or only low levels of lactose.

Lactase is used commercially to break down lactose in milk to produce dairy products which are suitable for people with lactose intolerance and/or have a sweeter taste. Because glucose and galactose are sweeter than lactose, lactase produces a more pleasant taste. Lactase is also used in the manufacture of ice cream. Lactose crystallises at the low temperatures of ice cream, whereas glucose and galactose stay liquid and contribute to a smoother texture. Lactase is also used in the conversion of whey into syrup. Lactase is also used for production of condensed milk.

Lactases have been isolated from a large variety of organisms, including microorganisms. Lactase is often an intracellular component of microorganisms like *Kluyveromyces* and *Bacillus*. *Kluyveromyces*, especially *K. fragilis* and *K. lactis*, and other fungi such as those of the genera *Candida, Torula* and *Torulopsis*, are a common source of fungal lactases, whereas *B. coagulans* and *B. circulans* are well known sources for bacterial lactases. Several commercial lactase preparations derived from these organisms are available such as Lactozym® (available from Novozymes, Denmark), HA-Lactase (available from Chr. Hansen, Denmark) and Maxilact® (available from DSM, the Netherlands), all from *K. lactis*. All these lactases are so called neutral lactases having a pH optimum between pH 6 and pH 8. When such lactases are used in the production of, e.g., low-lactose yoghurt, the enzyme treatment will have to be done in a separate step before fermentation or rather high enzyme dosages have to be used, because their activity drops as the pH decreases during fermentation. Also, these lactases are not suitable for hydrolysis of lactose in milk performed at high temperature, which would in some cases be beneficial to keep the microbial count low and thus ensure good milk quality.

Several extracellular lactases have been described having a lower pH optimum, see, e.g., U.S. Pat. No. 5,736,374 which describes an example of such lactase, produced by *Aspergillus oryzae*.

A lactase from *Bifidobacterium bifidum* has been described having a high transgalactosylating activity, both in the full-length form and especially when truncated from the C-terminal end (see, e.g., Jorgensen et al., 2001, *Appl. Microbiol. Biotechnol.* 57: 647-652 or EP Patent No. 1,283,876).

It is an object of the present invention to provide a method for production of dairy products, e.g., fermented dairy products, such as yoghurt, having a low level of lactose by using a lactase. It is also an object to provide a method for production of low-lactose beverage milk having an extended shelf-life by using a lactase, where the method gives rise to low formation of off-flavour and/or low formation of brown color as compared to known methods. Lactase to be used according to the invention should hydrolyze lactose efficiently and optimally allow for almost complete lactose hydrolysis. Especially, such lactase should have a high ratio of lactase to transgalactosylase activity. For use in the production of fermented dairy products, the lactase should be active over a broad pH range.

SUMMARY OF THE INVENTION

The present inventors have surprisingly found that a C-terminally truncated fragment of the extracellular lactase from *Bifidobacterium bifidum*, which was originally isolated and patented for its ability to make high amounts of galactooligosaccharides from lactose, can be used very successfully for hydrolysis of lactose in milk. When tested in water+100 g/l lactose at 37° C., the enzyme makes galactooligosaccharides with high efficiency as described in the prior art. However, when tested in milk, the ratio of hydrolytic to transgalactosylating activity has changed markedly, resulting in efficient hydrolysis and very low production of galactooligosaccharides.

Consequently, the present invention relates to a method for producing a dairy product comprising
 a) providing a milk-based substrate comprising lactose; and
 b) treating said substrate with an enzyme having lactase activity and having an amino acid sequence which is at least 70% identical to amino acids 28-1931 of SEQ ID NO: 1 or a fragment thereof.

In a preferred aspect, the invention relates to a method for producing a dairy product comprising
 a) providing a milk-based substrate comprising lactose; and b) treating said substrate with an enzyme having lactase activity and having an amino acid sequence which is at least 70% identical to amino acids 28-1331 of SEQ ID NO: 2.

Further, the inventors have surprisingly found that very low levels of lactose can be achieved when using the lactase from *Bifidobacterium bifidum* as compared to other lactases typically used for treatment of milk. Another unexpected advantage of using the lactase from *Bifidobacterium bifidum* is that the enzyme is active at high temperatures, allowing for treatment of the milk at, e.g., 52° C., thus reducing the microbial count and thereby improving the quality of the milk.

Therefore, in another aspect, the present invention relates to a method for producing a dairy product comprising
a) providing a milk-based substrate comprising lactose, and
b) treating said substrate with an enzyme having lactase activity,
where step b) takes place at a temperature of at least 50° C.

In a preferred embodiment, step b) takes place at a temperature of at least 52° C.

Also, the inventors have surprisingly found that the lactase from *Bifidobacterium bifidum* is active over a broad pH range.

Therefore, in another aspect, the present invention relates to a method for producing a dairy product comprising
a) providing a milk-based substrate comprising lactose, and
b) treating said substrate with an enzyme having lactase activity, where the pH optimum of the lactase activity at 37° C. is above pH 5, and where the lactase activity of the enzyme at pH 5 is at least 50% of its lactase activity at pH 6 when measured at 37° C.

Use of a lactase enzyme being active over a broad pH spectrum is especially useful for the production of fermented dairy products, where it allows for low enzyme dosage, since the enzyme is still active during and after fermentation. Also, very low levels of lactose in the fermented dairy product can be reached using such enzyme.

Therefore, in a preferred aspect, the present invention relates to a method for producing a low-lactose fermented dairy product comprising
a) providing a milk-based substrate comprising lactose,
b) treating said substrate with an enzyme having lactase activity, where the pH optimum of the lactase activity at 37° C. is above pH 5, and where the lactase activity of the enzyme at pH 5 is at least 50% of its lactase activity at pH 6 when measured at 37° C., and
c) fermenting said substrate with a microorganism.

The present inventors have also surprisingly found that in the manufacture of low-lactose beverage milk having an extended shelf life, the lactose hydrolysis can preferentially be carried out at high temperature, such as at a temperature of at least 60° C. Preferentially, such manufacture may comprise simultaneous low-pasteurization and lactase treatment. Therefore, in a preferred aspect, the present invention relates to a method for producing a dairy product comprising
a) providing a milk-based substrate comprising lactose, and
b) treating said substrate with an enzyme having lactase activity, wherein step b) is performed for between 10 minutes and 4 hours at a temperature of between 62° C. and 64° C.

In a more preferred aspect, step b) in such method is followed by cooling to below 10° C. without further heat treatment. This will allow for the enzyme to be still active after the milk has been cooled, i.e., during its storage. In another more preferred aspect, step b) in such method is followed by UHT treatment.

Preferably, in the methods of the invention, at least 70% of the lactose in the milk-based substrate is hydrolyzed. More preferably, at least 80%, such as at least 85%, at least 90%, at least 95% or at least 98%, of the lactose in the milk-based substrate is hydrolyzed.

In another aspect, the present invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 3 or a fragment thereof.

In another aspect, the present invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 4 or a fragment thereof.

In another aspect, the present invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 5 or a fragment thereof.

In another aspect, the present invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 6 or a fragment thereof.

In yet another aspect, the present invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 7 or a fragment thereof.

DETAILED DISCLOSURE OF THE INVENTION

Milk-Based Substrate

The term "milk", in the context of the present invention, is to be understood as the lacteal secretion obtained by milking any mammal, such as cows, sheep, goats, buffaloes or camels.

"Milk-based substrate", in the context of the present invention, may be any raw and/or processed milk material. Useful milk-based substrates include, but are not limited to solutions/suspensions of any milk or milk like products comprising lactose, such as whole or low fat milk, skim milk, buttermilk, reconstituted milk powder, condensed milk, solutions of dried milk, UHT milk, whey, whey permeate, acid whey, or cream.

Preferably, the milk-based substrate is milk or an aqueous solution of skim milk powder.

The milk-based substrate may be more concentrated than raw milk.

In one embodiment, the milk-based substrate has a ratio of protein to lactose of at least 0.2, preferably at least 0.3, at least 0.4, at least 0.5, at least 0.6 or, most preferably, at least 0.7.

The milk-based substrate may be homogenized and pasteurized according to methods known in the art.

"Homogenizing" as used herein means intensive mixing to obtain a soluble suspension or emulsion. It may be performed so as to break up the milk fat into smaller sizes so that it no longer separates from the milk. This may be accomplished by forcing the milk at high pressure through small orifices.

"Pasteurizing" as used herein means reducing or eliminating the presence of live organisms, such as microorganisms, in the milk-based substrate. Preferably, pasteurization is attained by maintaining a specified temperature for a specified period of time. The specified temperature is usually attained by heating. The temperature and duration may be selected in order to kill or inactivate certain bacteria, such as harmful bacteria, and/or to inactivate enzymes in the milk. A rapid cooling step may follow.

Dairy Product

A "dairy product" in the context of the present invention may be any food product wherein one of the major constituents is milk-based. Preferable, the major constituent is milk-based. More preferably, the major constituent is a milk-based substrate which has been treated with an enzyme having lactase activity according to a method of the invention. In the context of the present invention "one of the major constituents" means a constituent having a dry matter which constitutes more than 20%, preferably more than 30% or more than 40% of the total dry matter of the dairy product, whereas "the major constituent" means a constituent having a dry matter which constitutes more than 50%, preferably more than 60% or more than 70% of the total dry matter of the dairy product.

A dairy product according to the invention may be, e.g., skim milk, low fat milk, whole milk, cream, UHT milk, milk having an extended shelf life, a fermented milk product, cheese, yoghurt, butter, dairy spread, butter milk, acidified milk drink, sour cream, whey based drink, ice cream, condensed milk, dulce de leche or a flavoured milk drink. A dairy product may be manufactured by any method known in the art.

A dairy product may additionally comprise non-milk components, e.g., vegetable components such as, e.g., vegetable oil, vegetable protein, and/or vegetable carbohydrates. Dairy products may also comprise further additives such as, e.g., enzymes, flavouring agents, microbial cultures such as probiotic cultures, salts, sweeteners, sugars, acids, fruit, fruit juices, or any other component known in the art as a component of, or additive to, a dairy product.

In one embodiment of the invention, one or more milk components and/or milk fractions account for at least 50% (weight/weight), such as at least 70%, e.g., at least 80%, preferably at least 90%, of the dairy product.

In one embodiment of the invention, one or more milk-based substrates having been treated with an enzyme having lactase activity according to a method of the invention account for at least 50% (weight/weight), such as at least 70%, e.g., at least 80%, preferably at least 90%, of the dairy product.

In one embodiment of the invention, the dairy product is a dairy product which is not enriched by addition of galactooligosaccharides.

In one embodiment of the invention, the enzyme-treated milk-based substrate is not dried before being used as an ingredient in the dairy product.

In one embodiment of the invention, the dairy product is ice cream. In the present context, ice cream may be any kind of ice cream such as full fat ice cream, low fat ice cream, or ice cream based on yoghurt or other fermented milk products. Ice cream may be manufactured by any method known in the art.

In one embodiment of the invention, the dairy product is milk or condensed milk.

In one preferred embodiment of the invention, the dairy product is UHT milk. UHT milk in the context of the present invention is milk which has been subjected to a sterilization procedure which is intended to kill all microorganisms, including the bacterial spores. UHT (ultra high temperature) treatment may be, e.g., heat treatment for 30 seconds at 130° C., or heat treatment for one second at 145° C.

In one preferred embodiment of the invention, the dairy product is ESL milk. ESL milk in the context of the present invention is milk which has an extended shelf life due to microfiltration and/or heat treatment and which is able to stay fresh for at least 15 days, preferably for at least 20 days, on the store shelf at 2-5° C.

In another preferred embodiment of the invention, the dairy product is a fermented dairy product, e.g., yoghurt.

Fermented Dairy Product

A "fermented dairy product" in the context of the present invention is to be understood as any dairy product wherein any type of fermentation forms part of the production process. Examples of fermented dairy products are products like yoghurt, buttermilk, creme fraiche, quark and fromage frais. A fermented dairy product may be produced by any method known in the art.

"Fermentation" in the method of the present invention means the conversion of carbohydrates into alcohols or acids through the action of a microorganism. Preferably, fermentation in the method of the present invention comprises conversion of lactose to lactic acid.

In the context of the present invention, "microorganism" may include any bacterium or fungus being able to ferment the milk substrate.

The microorganisms used for most fermented milk products are selected from the group of bacteria generally referred to as lactic acid bacteria. As used herein, the term "lactic acid bacterium" designates a gram-positive, microaerophilic or anaerobic bacterium, which ferments sugars with the production of acids including lactic acid as the predominantly produced acid, acetic acid and propionic acid. The industrially most useful lactic acid bacteria are found within the order "Lactobacillales" which includes *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp. Additionally, lactic acid producing bacteria belonging to the group of anaerobic bacteria, bifidobacteria, i.e., *Bifidobacterium* spp., which are frequently used as food cultures alone or in combination with lactic acid bacteria, are generally included in the group of lactic acid bacteria.

Lactic acid bacteria are normally supplied to the dairy industry either as frozen or freeze-dried cultures for bulk starter propagation or as so-called "Direct Vat Set" (DVS) cultures, intended for direct inoculation into a fermentation vessel or vat for the production of a fermented dairy product. Such cultures are in general referred to as "starter cultures" or "starters".

Commonly used starter culture strains of lactic acid bacteria are generally divided into mesophilic organisms having optimum growth temperatures at about 30° C. and thermophilic organisms having optimum growth temperatures in the range of about 40 to about 45° C. Typical organisms belonging to the mesophilic group include *Lactococcus lactis, Lactococcus lactis* subsp. *cremoris, Leuconostoc mesenteroides* subsp. *cremoris, Pseudoleuconostoc mesenteroides* subsp. *cremoris, Pediococcus pentosaceus, Lactococcus lactis* subsp. *lactis* biovar. *diacetylactis, Lactobacillus casei* subsp. *casei* and *Lactobacillus paracasei* subsp. *paracasei*. Thermophilic lactic acid bacterial species include as examples *Streptococcus thermophilus, Enterococcus faecium, Lactobacillus delbrueckii* subsp. *lactis, Lactobacillus helveticus, Lactobacillus delbrueckii* subsp. *bulgaricus* and *Lactobacillus acidophilus*.

Also the anaerobic bacteria belonging to the genus *Bifidobacterium* including *Bifidobacterium bifidum, Bifidobacterium animalis* and *Bifidobacterium longum* are commonly used as dairy starter cultures and are generally included in the group of lactic acid bacteria. Additionally, species of Propionibacteria are used as dairy starter cultures, in particular, in the manufacture of cheese. Additionally, organisms belonging to the *Brevibacterium* genus are commonly used as food starter cultures.

Another group of microbial starter cultures are fungal cultures, including yeast cultures and cultures of filamentous fungi, which are particularly used in the manufacture of certain types of cheese and beverage. Examples of fungi include *Penicillium roqueforti, Penicillium candidum, Geotrichum candidum, Torula kefir, Saccharomyces kefir* and *Saccharomyces cerevisiae*.

In one embodiment of the present invention, the microorganism used for fermentation of the milk-based substrate is *Lactobacillus casei* or a mixture of *Streptococcus thermophilus* and *Lactobacillus delbrueckii* subsp. *bulgaricus*.

Fermentation processes to be used in a method of the present invention are well known and the person of skill in the art will know how to select suitable process conditions, such as temperature, oxygen, amount and characteristics of microorganism/s, additives such as, e.g., carbohydrates, flavours, minerals, enzymes, and process time. Obviously, fermentation conditions are selected so as to support the achievement of the present invention.

As a result of fermentation, pH of the milk-based substrate will be lowered. The pH of a fermented dairy product of the invention may be, e.g., in the range 3.5-6, such as in the range 3.5-5, preferably in the range 3.8-4.8.

In a preferred embodiment, the fermented dairy product is yoghurt.

Method for Producing a Dairy Product

As mentioned above, the present invention in one aspect relates to a method for producing a dairy product comprising:
a) providing a milk-based substrate comprising lactose; and
b) treating said substrate with an enzyme having lactase activity and having an amino acid sequence which is at least 70% identical to amino acids 28-1931 of SEQ ID NO: 1 or a fragment thereof.

In a preferred aspect, the invention relates to a method for producing a dairy product comprising
a) providing a milk-based substrate comprising lactose; and
b) treating said substrate with an enzyme having lactase activity and having an amino acid sequence which is at least 70% identical to amino acids 28-1331 of SEQ ID NO: 2.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 3 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 4 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 5 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 6 or a fragment thereof.

In another aspect, the invention relates to a method for producing a dairy product comprising
a) providing a milk-based substrate comprising lactose; and
b) treating said substrate with an enzyme having lactase activity and having an amino acid sequence which is at least 70% identical to SEQ ID NO: 7 or a fragment thereof.

In another aspect, the invention relates to a method for producing a dairy product comprising
a) providing a milk-based substrate comprising lactose, and
b) treating said substrate with an enzyme having lactase activity, wherein step b) takes place at a temperature of at least 50° C.

In yet another aspect, the invention relates to a method for producing a dairy product comprising
a) providing a milk-based substrate comprising lactose,
b) treating said substrate with an enzyme having lactase activity, where the pH optimum of the lactase activity at 37° C. is above pH 5, and where the lactase activity of the enzyme at pH 5 is at least 50% of its lactase activity at pH 6 when measured at 37° C.

The skilled person will know how to determine the lactase activity at different pH and thereby determine the pH optimum for the enzyme. The lactase activity at different pH may be determined by measuring hydrolysis of lactose at 37° C. for 30 minutes, preferably in a buffer comprising succinate, HEPES, CHES, KCl, $CaCl_2$ and $MgCl_2$, e.g., by using a method as described in the Examples of the present application. For the avoidance of doubt, HEPES is a buffering agent, 4-(2-hydroxyethyl)-1-piperazineethanesulfonic acid, and CHES is a buffering agent, N-Cyclohexyl-2-aminoethanesulfonic acid.

The enzyme-treated milk-based substrate may optionally be mixed with other ingredients to obtain the dairy product. In one embodiment of the invention, the enzyme-treated milk-based substrate is mixed with other ingredients to obtain the dairy product.

In one embodiment of the invention, the dairy product is milk. In another embodiment, the dairy product is condensed milk. In another embodiment, the dairy product is ice cream. In another embodiment, the dairy product is UHT milk. In another embodiment, the dairy product is ESL milk.

In yet another embodiment, the dairy product is a fermented dairy product, e.g., yoghurt.

Preferably, the dairy product is a low-lactose dairy product. "Low-lactose", in the context of the present invention, means that the amount of lactose in the dairy product, such as in the fermented dairy product, has been reduced by at least 70%, preferably 80%, 90%, 95%, 98%, 99% or 99.5%.

Method for Producing a Low-Lactose Fermented Dairy Product

One embodiment of the present invention relates to a method for producing a low-lactose fermented dairy product comprising
a) providing a milk-based substrate comprising lactose,
b) treating said substrate with an enzyme having lactase activity, where the lactase activity of the enzyme at pH 5 is at least 50% of its lactase activity at pH 6 when measured at 37° C., and
c) fermenting said substrate with a microorganism.

Another embodiment of the invention relates to a method for producing a low-lactose fermented dairy product comprising
a) providing a milk-based substrate comprising lactose,
b) treating said substrate with an enzyme having lactase activity and having an amino acid sequence which is at least 70% identical to SEQ ID NO: 1, SEQ ID NO: 2, SEQ ID NO: 3, SEQ ID NO: 4, SEQ ID NO: 5, SEQ ID NO: 6, SEQ ID NO: 7, ora fragment of any of these, and
c) fermenting said substrate with a microorganism.

Preferably, in these embodiments, step b) and step c) are performed essentially at the same time.

In the context of the method of the invention, "essentially at the same time" means that enzyme treatment and fermentation are not performed as separate steps, i.e., incubation of the milk-based substrate with the enzyme is not performed as a separate step before inoculation with the microorganism. Instead, the enzyme and the microorganism may be added to the milk-based substrate at essentially the same time. I.e., the enzyme may be added to the milk-based substrate immediately before inoculation with the microorganism. "Immediately before" in this context means without a separate incubation step for the enzymatic hydrolysis. Alternatively, the microorganism may be added immediately before the enzyme, or the microorganism and the enzyme may be added at the same time. "Essentially at the same time" in the context of the method of the invention may mean that the enzyme is active throughout the whole of step c).

"Essentially at the same time" does not mean that the enzymatic hydrolysis of the lactose in the milk-based substrate is completed when the fermentation is completed, i.e., when the pH has dropped to a level preventing further fermenting activity of the microbial starter culture.

In a preferred embodiment of the invention, the enzyme is still active after completion of step c). In a more preferred embodiment, the enzyme has retained at least 20%, such as at least 30%, at least 40%, at least 50%, at least 60% or at least 70%, of its lactase activity after completion of step c) as compared to its activity when added to the milk-based substrate.

After completion of step c) may mean when at least one of the below is true:
temperature is lowered to below 30° C.
pH has reached 4.55
pH does no longer decrease by more than 0.2 units per hour.

In another preferred embodiment, less than 80%, such as less than 70%, less than 60%, less than 50%, less than 40%, less than 30% or less than 20%, of the lactose has been hydrolyzed after two hours of fermentation. "After two hours of fermentation" in the context of the invention means that the milk-based substrate, after having been inoculated with the microorganism, has been incubated for two hours at a temperature which is appropriate for the fermentation process.

In another preferred embodiment, less than 80%, such as less than 70%, less than 60%, less than 50%, less than 40%, less than 30% or less than 20%, of the lactose has been hydrolyzed when pH of the milk-based substrate has dropped to pH 5.

In yet another preferred embodiment, less than 80%, such as less than 70%, less than 60%, less than 50%, less than 40%, less than 30% or less than 20%, of the lactose has been hydrolyzed when step c) is completed.

In a preferred embodiment, more than 70%, such as more than 80%, more than 90%, more than 95%, more than 97%, more than 98% or more than 99%, of the lactose in the milk-based substrate has been hydrolyzed two days, i.e., 48 hours, after start of the fermentation. "Start of the fermentation" is when the milk-based substrate has been inoculated with the microorganism and incubated at a temperature which is appropriate for the fermentation process.

In another preferred embodiment, more than 70%, such as more than 80%, more than 90%, more than 95%, more than 97%, more than 98% or more than 99%, of the lactose in the milk-based substrate has been hydrolyzed two days, i.e., 48 hours, after completion of step c).

In another preferred embodiment, more than 70%, such as more than 80%, more than 90%, more than 95%, more than 97%, more than 98% or more than 99%, of the lactose in the milk-based substrate has been hydrolyzed in the final fermented dairy product. The "final fermented dairy product" is the fermented dairy product as sold to the consumer of the product.

In the embodiments of the invention where the milk-based substrate is being fermented, the enzyme treatment is preferably conducted at the natural pH of the milk-based substrate during the fermentation process, i.e., the pH will gradually decrease from the natural pH of the unfermented milk-based substrate to the pH of the fermented milk-based substrate. In such aspect, the enzyme treatment is preferably conducted at an appropriate temperature for the fermentation process.

Method for Producing a Low-Lactose Beverage Milk Product Having an Extended Shelf Life One embodiment of the present invention relates to a method for producing a low-lactose milk product comprising
a) providing a milk-based substrate comprising lactose, and b) treating said substrate with an enzyme having lactase activity, wherein step b) takes place at a temperature of at least 60° C.

In a preferred embodiment, step b) takes place at a temperature of at least 62° C., such as at least 63° C., more preferred at a temperature of at least 64° C., such as at least 65° C., at least 67° C. or at least 70° C., and most preferred at a temperature of at least 75° C.

The low-lactose milk product may be beverage milk having a longer shelf life than fresh milk which normally has a shelf life of 4-7 days. It may have an improved quality as compared to other low-lactose beverage milk products having a longer shelf life. It may, e.g., have a lower microbial count, a less bitter taste and/or a less brown colour.

Preferably, the milk product is ESL milk. More preferably, the milk product is UHT milk.

In a preferred aspect, the milk-based substrate is raw milk. In another preferred aspect, the milk-based substrate, preferably raw milk, has not been pasteurized before step b).

In a preferred aspect, no pasteurization of the enzyme treated milk-based substrate is performed after step b).

In a preferred aspect, microfiltration of the milk-based substrate is performed before step b). In that case, the enzyme should preferentially be sterile. In another preferred aspect, microfiltration of the enzyme treated milk-based substrate is performed after step b).

In a preferred aspect, step b) is performed for between 10 minutes and 4 hours at a temperature of between 62° C. and 64° C. In a more preferred aspect, step b) is performed for between 20 minutes and 2 hours at a temperature of between 62° C. and 64° C. In an even more preferred aspect, step b) is performed for between 20 and 60 minutes, such as for about 30 minutes, at a temperature of about 63° C. Such simultaneous low pasteurization and lactase treatment of, e.g., raw milk will give rise to low-lactose beverage milk having a higher quality as compared to low-lactose beverage milk where lactase treatment has been performed at low temperature, e.g., at 5° C. for up to 24 hours as is often used in the dairy industry.

In a more preferred aspect, step b) is followed by cooling to below 10° C. without further heat treatment. This will allow for the enzyme to be still active after the milk has been cooled, i.e., during its storage. Preferably, less than 80% of the lactose has been hydrolyzed when step b) is completed, and more than 90% of the lactose has been hydrolyzed after one week. More preferably, less than 60% of the lactose has been hydrolyzed when step b) is completed, and more than 95% of the lactose has been hydrolyzed after one week In another more preferred aspect, step b) is followed by UHT treatment.

Enzyme Having Lactase Activity

In step b) in the methods of the present invention, the milk-based substrate is treated with an enzyme having lactase activity.

A lactase in the context of the present invention is any glycoside hydrolase having the ability to hydrolyse the disaccharide lactose into constituent galactose and glucose monomers. The group of lactases comprises but is not limited to enzymes assigned to subclass EC 3.2.1.108. Enzymes assigned to other subclasses, such as, e.g., EC 3.2.1.23, may also be lactases in the context of the present invention. A lactase in the context of the invention may have other activities than the lactose hydrolyzing activity, such as for example a transgalactosylating activity. In the context of the invention, the lactose hydrolyzing activity of the lactase may be referred to as its lactase activity or its beta-galactosidase activity.

Enzymes having lactase activity to be used in a method of the present invention may be of animal, of plant or of microbial origin. Preferred enzymes are obtained from microbial sources, in particular from a filamentous fungus or yeast, or from a bacterium.

The enzyme may, e.g., be derived from a strain of *Agaricus*, e.g., *A. bisporus*; *Ascovaginospora*; *Aspergillus*, e.g., *A. niger, A. awamori, A. foetidus, A. japonicus, A. oryzae*; *Candida*; *Chaetomium*; *Chaetotomastia*; *Dictyostelium*, e.g., *D. discoideum*; *Kluveromyces*, e.g., *K. fragilis, K. lactis*; *Mucor*, e.g., *M. javanicus, M. mucedo, M. subtilissimus*; *Neurospora*, e.g., *N. crassa*; *Rhizomucor*, e.g., *R. pusillus*; *Rhizopus*, e.g., *R. arrhizus, R. japonicus, R. stolonifer*; *Sclerotinia*, e.g., *S. libertiana*; *Torula*; *Torulopsis*; *Trichophyton*, e.g., *T. rubrum*; *Whetzelinia*, e.g., *W. sclerotiorum*; *Bacillus*, e.g., *B. coagulans, B. circulans, B. megaterium, B. novalis, B. subtilis, B. pumilus, B. stearothermophilus, B. thuringiensis*; *Bifidobacterium*, e.g., *B. longum, B. bifidum, B. animalis*; *Chryseobacterium*; *Citrobacter*, e.g., *C. freundii*; *Clostridium*, e.g., *C. perfringens*; *Diplodia*, e.g., *D. gossypina*; *Enterobacter*, e.g., *E. aerogenes, E. cloacae Edwardsiella, E. tarda*; *Erwinia*, e.g., *E. herbicola*; *Escherichia*, e.g., *E. coli*; *Klebsiella*, e.g., *K. pneumoniae*; *Miriococcum*; *Myrothesium*; *Mucor*; *Neurospora*, e.g., *N. crassa*; *Proteus*, e.g., *P. vulgaris*; *Providencia*, e.g., *P. stuartii*; *Pycnoporus*, e.g., *Pycnoporus cinnabarinus, Pycnoporus sanguineus*; *Ruminococcus*, e.g., *R. torques*; *Salmonella*, e.g., *S. typhimurium*; *Serratia*, e.g., *S. liquefasciens, S. marcescens*; *Shigella*, e.g., *S. flexneri*; *Streptomyces*, e.g., *S. antibioticus, S. castaneoglobisporus, S. violeceoruber*; *Trametes*; *Trichoderma*, e.g., *T. reesei, T. viride*; *Yersinia*, e.g., *Y. enterocolitica*.

In a preferred embodiment, the enzyme is a lactase from a bacterium, e.g., from the family Bifidobacteriaceae, such as from the genus *Bifidobacterium*, such as from a strain of *B. bifidum, B. animalis* or *B. longum*. In a more preferred embodiment, the enzyme is a lactase from *Bifidobacterium bifidum*. A preferred enzyme is a lactase having a sequence which is at least 50%, such as at least 60%, at least 70%, at least 80%, at least 90%, at least 95% or at least 98% identical to amino acids 28-1931 of SEQ ID NO: 1 or to a lactase active fragment thereof. Such lactase active fragment of SEQ ID NO: 1 may be any fragment of SEQ ID NO: 1 having lactase activity. A lactase active fragment of SEQ ID NO: 1 may be, e.g., amino acids 28-979, amino acids 28-1170, amino acids 28-1323, amino acids 28-1331, or amino acids 28-1600 of SEQ ID NO: 1.

In a preferred embodiment, an enzyme having lactase activity to be used in a method of the present invention comprises an amino acid sequence which is at least 50% identical to amino acids 28-1331 of SEQ ID NO: 2. In a more preferred embodiment, the enzyme comprises an amino acid sequence which is at least 60%, such as at least 70%, at least 80%, at least 90%, at least 95% or at least 98% identical to amino acids 28-1331 of SEQ ID NO: 2.

In another preferred embodiment, an enzyme having lactase activity to be used in a method of the present invention has an amino acid sequence which is at least 50% identical to amino acids 28-1331 of SEQ ID NO: 2. In a more preferred embodiment, the enzyme has an amino acid sequence which is at least 60%, such as at least 70%, at least 80%, at least 90%, at least 95% or at least 98% identical to amino acids 28-1331 of SEQ ID NO: 2.

In another embodiment, an enzyme having lactase activity to be used in a method of the present invention has an amino acid sequence which is at least 50% identical to SEQ ID NO: 3. Preferably, the enzyme has an amino acid sequence which is at least 60%, such as at least 70%, at least 80%, at least 90%, at least 95% or at least 98% identical to SEQ ID NO: 3.

In another embodiment, an enzyme having lactase activity to be used in a method of the present invention has an amino acid sequence which is at least 50% identical to SEQ ID NO: 4. Preferably, the enzyme has an amino acid sequence which is at least 60%, such as at least 70%, at least 80%, at least 90%, at least 95% or at least 98% identical to SEQ ID NO: 4.

In another embodiment, an enzyme having lactase activity to be used in a method of the present invention has an amino acid sequence which is at least 50% identical to SEQ ID NO: 5. Preferably, the enzyme has an amino acid sequence which is at least 60%, such as at least 70%, at least 80%, at least 90%, at least 95% or at least 98% identical to SEQ ID NO: 5.

In another embodiment, an enzyme having lactase activity to be used in a method of the present invention has an amino acid sequence which is at least 50% identical to SEQ ID NO: 6. Preferably, the enzyme has an amino acid sequence which is at least 60%, such as at least 70%, at least 80%, at least 90%, at least 95% or at least 98% identical to SEQ ID NO: 6.

In another embodiment, an enzyme having lactase activity to be used in a method of the present invention has an amino acid sequence which is at least 50% identical to SEQ ID NO: 7. Preferably, the enzyme has an amino acid sequence which is at least 60%, such as at least 70%, at least 80%, at least 90%, at least 95% or at least 98% identical to SEQ ID NO: 7.

For purposes of the present invention, the degree of identity between two amino acid sequences is determined using the Needleman-Wunsch algorithm (Needleman and Wunsch (1970) *J. Mol. Biol.* 48: 443-453) as implemented in the Needle program of the EMBOSS package (EMBOSS: The European Molecular Biology Open Software Suite, Rice et al. (2000) Trends in Genetics 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labelled "longest identity" (obtained using the –no brief option) is used as the percent identity and is calculated as follows:

(Identical Residues×100)/(Length of Alignment– Total Number of Gaps in Alignment)

Lactases to be used in a method of the present invention may be extracellular. They may have a signal sequence at their N-terminus, which is cleaved off during secretion.

Lactases to be used in a method of the present invention may be derived from any of the sources mentioned herein. The term "derived" means in this context that the enzyme may have been isolated from an organism where it is present natively, i.e., the identity of the amino acid sequence of the enzyme are identical to a native enzyme. The term "derived" also means that the enzymes may have been produced recombinantly in a host organism, the recombinantly produced enzyme having either an identity identical to a native enzyme or having a modified amino acid sequence, e.g., having one or more amino acids which are deleted, inserted and/or substituted, i.e., a recombinantly produced enzyme which is a mutant and/or a fragment of a native amino acid sequence. Within the meaning of a native enzyme are included natural variants. Furthermore, the term "derived" includes enzymes produced synthetically by, e.g., peptide synthesis. The term "derived" also encompasses enzymes which have been modified, e.g., by glycosylation, phosphorylation etc., whether in vivo or in vitro. With respect to recombinantly produced enzyme the term "derived from" refers to the identity of the enzyme and not the identity of the host organism in which it is produced recombinantly.

The lactase may be obtained from a microorganism by use of any suitable technique. For instance, a lactase enzyme preparation may be obtained by fermentation of a suitable microorganism and subsequent isolation of a lactase preparation from the resulting fermented broth or microorganism by methods known in the art. The lactase may also be obtained by use of recombinant DNA techniques. Such method normally comprises cultivation of a host cell transformed with a recombinant DNA vector comprising a DNA sequence encoding the lactase in question and the DNA sequence being operationally linked with an appropriate expression signal such that it is capable of expressing the lactase in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

Lactases to be used in a method of the present invention may be purified. The term "purified" as used herein covers lactase enzyme protein essentially free from insoluble components from the production organism. The term "purified" also covers lactase enzyme protein essentially free from insoluble components from the native organism from which it is obtained. Preferably, it is also separated from some of the soluble components of the organism and culture medium from which it is derived. More preferably, it is separated by one or more of the unit operations: filtration, precipitation, or chromatography.

Accordingly, the enzyme having lactase activity may be purified, viz. only minor amounts of other proteins being present. The expression "other proteins" relate in particular to other enzymes. The term "purified" as used herein also refers to removal of other components, particularly other proteins and most particularly other enzymes present in the cell of origin of the lactase. The lactase may be "substantially pure", i.e., free from other components from the organism in which it is produced, i.e., e.g., a host organism for recombinantly produced lactase. Preferably, the lactase is an at least 40% (w/w) pure enzyme protein preparation, more preferably at least 50%, 60%, 70%, 80% or even at least 90% pure.

The term enzyme having lactase activity includes whatever auxiliary compounds that may be necessary for the enzyme's catalytic activity, such as, e.g., an appropriate acceptor or cofactor, which may or may not be naturally present in the reaction system.

The enzyme may be in any form suited for the use in question, such as, e.g., in the form of a dry powder or granulate, a non-dusting granulate, a liquid, a stabilized liquid, or a protected enzyme.

The enzyme is added in a suitable amount to achieve the desired degree of lactose hydrolysis under the chosen reaction conditions. The enzyme may be added at a concentration of between 100 and 5000 LAU per litre milk-based substrate, preferably less than 3000, such as less than 1500, less than 1000, less than 750 or less than 500, LAU per litre milk-based substrate.

In a preferred embodiment, the enzyme is added at a concentration of between 5 and 100 LAU per g lactose in the milk-based substrate, preferably less than 50, such as less than 40, less than 30, less than 20 or less than 10, LAU per g lactose in the milk-based substrate.

In the context of the present application, 1 lactase unit (1 LAU) is the amount of enzyme which releases 1 micromole glucose per minute in M-buffer at pH 6.5 and 37° C. with a lactose concentration of 4.75% w/v. M-buffer is prepared by dissolving 3.98 g $C_6H_5Na_3O_7$-$2H_2O$, 8.31 g citric acid, 0.9 g $K_2SO_4$, 2.6 g $K_2HPO_4$, 7.35 g $KH_2PO_4$, 5.45 g KOH, 4.15 g $MgCl_2$-$6H_2O$, 3.75 g $CaCl_2$-$2H_2O$ and 1.4 g $NaHCO_3$ in 4 litre water, adding 12.5 ml 4 N NaOH, adjusting to pH 6.5 using HCl, and adding water up to a total volume of 5 liter.

The activity in LAU of a specific lactase may be determined by direct measurement of glucose released from lactose under the conditions described above. The skilled person will know how to determine such activity. Alternatively, the activity may be determined by using the lactase activity assay described in Example 1 of the present application. Here, the activity is obtained by comparing to a standard curve run with a lactase of known activity, and the activity of the unknown sample calculated from this. The lactase of known activity may, e.g., be Lactozym obtained from Novozymes A/S, Denmark.

In a preferred embodiment, the enzyme having lactase activity to be used in a method of the present invention has a lactase activity at 37° C. and pH 5 which is at least 55%, such as at least 60%, at least 65%, at least 70% or at least 75%, of its lactase activity at 37° C. and pH 6.

In another preferred embodiment, the enzyme having lactase activity to be used in a method of the present invention has a lactase activity at 37° C. and pH 4.5 which is at least 10%, such as at least 20%, at least 30%, at least 35% or at least 40%, of its lactase activity at 37° C. and pH 6.

In another preferred embodiment, the enzyme having lactase activity to be used in a method of the present invention has a pH optimum of the lactase activity at 37° C. which is above pH 5.5.

In another preferred embodiment, the enzyme having lactase activity to be used in a method of the present invention has a lactase activity at a temperature of 52° C. and a pH of 6.5 which is at least 50%, such as at least 55%, at least 60%, at least 65%, at least 70%, at least 75% or at least 80%, of its lactase activity at a temperature of 38° C. and a pH of 6.5.

The skilled person will know how to determine the lactase activity at different pH and temperature. The lactase activity at different pH and temperature is preferably determined by using a method as described in the Examples of the present application.

In a preferred embodiment of the present invention, Km of the enzyme having lactase activity at 5° C. is below 25 mM, such as below 20 mM, below 15 mM or below 10 mM. In another preferred embodiment, Km of the enzyme having lactase activity at 37° C. is below 25 mM, such as below 20 mM or below 15 mM. The skilled person will know how to determine Km for the lactase activity at a specific temperature. Km may be determined by the method used in the Examples of the present application.

In another preferred embodiment, the enzyme when hydrolyzing the lactose in the milk-based substrate has a ratio of lactase to transgalactosylase activity of more than 1:1, such as more than 2:1 or more than 3:1. In another preferred embodiment, the enzyme treatment is performed under conditions where the lactase activity of the enzyme is higher than the transgalactosylase activity, such as at least two times higher or at least three times higher.

The ratio of lactase to transgalactosylase activity in the milk-based substrate may, e.g., be determined by HPLC analysis. In another preferred embodiment, the enzyme treatment is performed under conditions where at least 50% (w/w %) of the hydrolyzed lactose is converted into free galactose. In another preferred embodiment, the enzyme treatment is performed under conditions where the hydrolyzed lactose is converted into equal amounts of free glucose and free galactose.

Example 1

Lactase Activity-Assay in Eppendorf Tubes at 37° C., pH 6.5
Principle:
Lactase hydrolyzes lactose into glucose and galactose. Glucose is measured after a modified version of the common glucose oxidase/peroxidase assay (Werner et al., 1970, *Z. Analyt. Chem.* 252: 224).

LAU is defined as the amount of enzyme liberating 1 micromole of glucose per min at 37° C., pH 6.5 in M-buffer (M-buffer is defined in the description of the present patent application). Alternatively, the activity in LAU for a specific lactase may be determined by the method described here. The value obtained is compared to a standard curve run with a lactase of known activity, and the activity of the unknown sample calculated from this. The lactase of known activity may, e.g., be Lactozym obtained from Novozymes A/S, Denmark.

Solutions:
Assay buffer: 50 mM succinate, 50 mM HEPES, 50 mM CHES, 150 mM KCl, 2 mM $CaCl_2$, 1 mM $MgCl_2$, 0.01% Triton X100, pH 6.5
GOD-Perid solution: 65 mM sodium phosphate, pH 7, 0.4 g/l Glucose oxidase, 0.013 g/l HRP (Horse Radish Peroxidase), 0.65 g/l ABTS (2,2'-azino-bis(3-ethylbenzthiazoline-6-sulphonic acid)).
Substrate:
160 mM lactose, 50 mM succinate, 50 mM HEPES, 50 mM CHES, 150 mM KCl, 2 mM $CaCl_2$, 1 mom $MgCl_2$, pH 6.5.
Standard:
Lactozym (available from Novozymes A/S, Denmark) with a known activity in LAU/g is used as standard, diluted in assay buffer in the range from 0.09-0.7 LAU/g.
Samples:
Enzyme samples are diluted appropriately in assay buffer.
Procedure:
1. 375 ul substrate is incubated 5 minutes at 37° C.
2. 25 ul enzyme diluted in assay buffer is added.
3. The reaction is stopped after 30 minutes by adding 60 ul 1 M NaOH
4. 20 ul is transferred to a 96 well microtiter plate and 200 ul GOD-Perid solution is added.

After 30 minutes at room temperature, the absorbance is measured at 420 nm.

Example 2

100 ml 9% skimmed milk solution having approximately 5% lactose was made by mixing 9 g skimmed milk powder (Kerry) in 91 ml ionic water. 10 ml of the solution was transferred to a test tube containing a magnetic stirring bar and placed in a water bath at 37° C. After 15 min enzyme was added. Enzymes tested were Lactozym, a commercially available lactase from Novozymes A/S, Denmark, having an activity of 3060 LAU/g, and an experimental lactase from *Bifidobacterium bifidum* having the encoded sequence shown in SEQ ID NO: 2 and an activity of 295 LAU/g. Amino acids 1 to 27 of SEQ ID NO: 2 is a signal sequence which is presumably cleaved off and amino acids 1332 to 1341 is a tag used for purification of the experimental enzyme.

Dosages were 5640 LAU/l milk of Lactozym and 2700 LAU/l milk of the *Bifidobacterium* lactase. Milk samples were taken at regular intervals up till 4 hrs. and the enzyme inactivated by heating to 99° C. for 10 min in a thermomixer. Samples were diluted appropriately and filtered through a 0.20 um filter.

Lactose hydrolysis was measured using a Dionex BioLC equipped with a Dionex PA1 column and a Pulsed Amperiometrisk Detektor (PAD). Peaks were identified and quantified by comparing with known standards of lactose, glucose and galactose. Results are given below.

TABLE 1

Lactose, glucose and galactose in reconstituted skimmed milk after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 5 | 152 | 6 | 5 | 156 | 3 | 3 |
| 30 | 64 | 92 | 76 | 91 | 71 | 70 |
| 60 | 35 | 118 | 99 | 45 | 117 | 114 |
| 120 | 19 | 131 | 111 | 8 | 144 | 142 |
| 180 | 15 | 141 | 119 | 1 | 155 | 153 |
| 240 | 14 | 150 | 128 | 1 | 162 | 160 |

When tested in milk with 5% lactose, no transferase activity is observed when using the *Bifidobacterium* lactase. Glucose and galactose production are equal and total monosaccharide production match that expected from the lactose hydrolyzed. For comparison, Lactozym produces less galactose than glucose clearly showing that galactooligosaccharides have been produced. Also, final lactose levels are significantly lower when using the *Bifidobacterium* lactase illustrating the lower Km value of this enzyme.

Example 3

100 ml 15 or 30% (w/w) whey permeate containing primarily lactose and ions was made by mixing 15 or 30 g spray-dried whey permeate powder (Variolac, Arla) in 85 or 70 ml ionic water respectively. The solution was poured in a flask containing a magnetic stirring bar and placed in a water bath at 37° C. After 15 min, enzyme was added. Enzymes tested were Lactozym, a commercially available lactase from Novozymes A/S, Denmark, having an activity of 3060 LAU/g, and an experimental lactase from *Bifidobacterium bifidum* having the encoded sequence shown in SEQ ID NO: 2 and an activity of 295 LAU/g.

Dosages were 4225 LAU/l milk of Lactozym and 2025 LAU/l milk of the *Bifidobacterium* lactase. Milk samples were taken at regular intervals up till 5.5 hrs. and the enzyme inactivated by heating to 99° C. for 10 min in a thermomixer. Samples were diluted appropriately and filtered through a 0.20 um filter.

Lactose hydrolysis was measured using a Dionex BioLC equipped with a Dionex PA1 column and a Pulsed Amperiometrisk Detektor (PAD). Peaks were identified and quantified by comparing with known standards of lactose, glucose and galactose. Results are given below.

TABLE 2

Lactose, glucose and galactose in 15% DS whey permeate after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 0 | 499 | 1 | 2 | 499 | 1 | 2 |
| 30 | 312 | 135 | 106 | 410 | 61 | 63 |
| 60 | 211 | 224 | 155 | 349 | 119 | 122 |
| 120 | 110 | 295 | 221 | 220 | 199 | 202 |
| 180 | 66 | 324 | 249 | 149 | 281 | 290 |
| 240 | 50 | 346 | 279 | 84 | 336 | 348 |
| 330 | 37 | 372 | 312 | 31 | 350 | 368 |

TABLE 3

Lactose, glucose and galactose in 30% DS whey permeate after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 0 | 848 | 1 | 4 | 848 | 1 | 4 |
| 30 | 824 | 109 | 75 | 819 | 43 | 45 |
| 60 | 615 | 253 | 150 | 788 | 86 | 83 |
| 120 | 420 | 370 | 242 | 651 | 159 | 158 |
| 180 | 291 | 459 | 300 | 625 | 232 | 230 |
| 240 | 246 | 559 | 373 | 501 | 283 | 273 |
| 330 | 154 | 544 | 367 | 391 | 333 | 324 |
| 1440 | 54 | 649 | 545 | 20 | 727 | 739 |

Also when tested at higher lactose concentrations as in 15% or 30% whey permeate no or very little galactooligosaccharides are produced. Again, the produced galactose and glucose levels are equal and match the amount of lactose hydrolyzed. For comparison, Lactozym produces less galactose than glucose, clearly showing that galactooligosaccharides have been produced.

Example 4 pH Profile (at 37° C.) and Temperature Profile (at pH 6.5) of Experimental Lactase from *Bifidobacterium bifidum* Using Lactose as Substrate.

Principle:

Lactase hydrolyzes lactose and glucose+galactose is formed. Glucose is measured after a modified version of the common glucose oxidase/peroxidase assay (Werner et al., 1970, *Z. Analyt. Chem.* 252: 224.) pH profile Substrate:

167 mM lactose, 50 mM succinate, 50 mM HEPES, 50 mM CHES, 150 mM KCl, 2 mM $CaCl_2$, 1 mM $MgCl_2$ and pH adjusted to pH 3, 4, 5, 6, 7, 8, 9 and 10 with NaOH.

Enzyme Sample:

Experimental lactase from *Bifidobacterium bifidum* having the encoded sequence shown in SEQ ID NO: 2 was diluted appropriately in 150 mM KCl, 2 mM $CaCl_2$, 1 mM $MgCl_2$, 0.01% Triton X100.

Procedure:

10 ul enzyme sample diluted in enzyme dilution buffer was added to PCR tubes at room temperature.

90 ul substrate was added at room temp. and quickly placed in a Peltier Thermal Cycler (PCT-200, MJ research) at 37° C. and incubated for 30 min and then placed on ice.

The reaction was stopped by adding 100 ul 0.25 M NaOH. 20 ul was transferred to a 96 well microtitre plate and 230 ul 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.

TABLE 4

| pH | B. bifidum lactase relative activity (% of activity at pH6) |
|---|---|
| 3 | 0 |
| 4 | 4 |
| 5 | 75 |
| 6 | 100 |
| 7 | 85 |
| 8 | 39 |
| 9 | 10 |
| 10 | 4 |

Temperature Profile
Substrate:
167 mM lactose, 50 mM succinate, 50 mM HEPES, 50 mM CHES, 150 mM KCl, 2 mM CaCl$_2$, 1 mM MgCl$_2$ and pH adjusted to pH 6.5 with NaOH.
Enzyme Sample:
Experimental lactase from *Bifidobacterium bifidum* having the encoded sequence shown in SEQ ID NO: 2 was diluted appropriately in 50 mM succinate, 50 mM HEPES, 50 mM CHES, 150 mM KCl, 2 mM CaCl$_2$, 1 mM MgCl$_2$, 0.01% Triton X100 and pH adjusted to pH 6.5.
Procedure:
10 ul enzyme sample diluted in enzyme dilution buffer was added to PCR tubes at room temp.
90 ul preheated (in a Peltier Thermal Cycler 30-70° C.) substrate was added and incubation was performed with a temp. gradient from 30-70° C. for 30 min. and then placed on ice.
The reaction was stopped by adding 100 ul 0.25 M NaOH. 20 ul was transferred to a 96 well microtitre plate and 230 ul 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.

TABLE 5

| Temp. ° C. | B. bifidum lactase relative activity (% of activity at 38.1° C.) |
|---|---|
| 20 | 54 |
| 21 | 63 |
| 22 | 64 |
| 24 | 68 |
| 26 | 73 |
| 29 | 81 |
| 31 | 88 |
| 34 | 94 |
| 36 | 96 |
| 38 | 100 |
| 43 | 96 |
| 48 | 91 |
| 52 | 83 |
| 57 | 76 |
| 62 | 58 |
| 66 | 32 |
| 69 | 20 |
| 70 | 17 |

Example 5

Determination of Km for Lactase Enzymes at 5° C.
Principle:
Lactase hydrolyzes lactose and glucose+galactose is formed. Glucose is measured after a modified version of the common glucose oxidase/peroxidase assay (Werner et al., 1970, *Z. Analyt. Chem.* 252: 224.)
Substrate:
Different lactose concentrations ranging from Km/5 to 10*Km, 50 mM succinate, 50 mM HEPES, 50 mM CHES, 150 mM KCl, 2 mM CaCl$_2$, 1 mM MgCl$_2$ and pH adjusted to pH 6.5 with NaOH.
Enzyme Sample:
Experimental lactase from *Bifidobacterium bifidum* having the encoded sequence shown in SEQ ID NO: 2 was diluted appropriately in 50 mM succinate, 50 mM HEPES, 50 mM CHES, 150 mM KCl, 2 mM CaCl$_2$, 1 mM MgCl$_2$, 0.01% Triton X100, pH adjusted to pH 6.5 with NaOH.
12 g/l Lactozym (commercially available lactase from Novozymes A/S, Denmark) was diluted 6000 times in the same buffer.
Procedure:
10 ul enzyme sample (5° C.) was added to a 96 well microtitre plate on ice.
90 ul substrate (5° C.) was added and incubated for 2 hours at 5° C.
The reaction was stopped by adding 100 ul 0.25 M NaOH. 20 ul was transferred to a 96 well microtitre plate and 230 ul 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.
Km Determination:
Computerized nonlinear least-squares fitting and the Michaelis-Menten equation:

$$v=(V\max*S)/(Km+S)$$

was used. Km for the *Bifidobacterium* lactase and Lactozym were determined to be 8 mM and 30 mM, respectively.

In a similar test performed at 37° C., Km for the *Bifidobacterium* lactase and Lactozym were determined to be 13 mM and 30 mM, respectively.

Example 6

Yoghurt Trials
Commercial homogenized milk with 1.5% fat was pasteurized at 90° C. for 20 min. 200 ml of the milk was transferred into baby bottles and tempered to 43° C. The milk was inoculated with a frozen probiotic yoghurt culture from Chr. Hansen, Denmark, (F-DVS ABY-3) using an inoculation level of 0.02%. At the same time, enzyme was added to the milk. Enzyme products tested were Ha-lactase, a commercially available lactase from Chr. Hansen, Denmark, having an activity of 8021 LAU/g and an experimental lactase from *Bifidobacterium bifidum* having the encoded sequence shown in SEQ ID NO: 2 and an activity of 295 LAU/g.

Dosages were 1500, 3000 and 3750 LAU/L milk of Ha-lactase and 710, 1420, and 1780 LAU/L of the *Bifidobacterium* lactase. The milk samples were fermented at 43° C. until pH reached 4.55 within approximately five hours. The yoghurts were then stirred, cooled to 25° C. and placed at 8° C. for storage. Samples were collected 2 hours after addition of culture and enzyme, at end pH (pH 4.55) and after 20-24 hours (Day 1) of storage at 8° C. The biological activity was stopped by addition of sulphuric acid. Proteins were precipitated adding perchloric acid and MQW containing standards were then added.

Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 6

Lactose in yoghurt treated with different dosages of Ha-lactase or Bifidobacterium lactase. A reference sample with no addition of enzyme was also tested Lactose (mg/g)

| Time | Reference No lactase | HA-lactase | | | Bifidobacterium lactase | | |
|---|---|---|---|---|---|---|---|
| | | 1500 LAU/L | 3000 LAU/L | 3750 LAU/L | 710 LAU/L | 1420 LAU/L | 1780 LAU/L |
| Initial | 56.0 | | | | | | |
| 2 h | 48.4 | 13.3 | 3.4 | 2.6 | 29.6 | 10.2 | 5.7 |
| End pH | 39.0 | 10.9 | 2.5 | 1.9 | 8.7 | 0.6 | 0.6 |
| Day 1 | 39.3 | 10.5 | 2.4 | 1.8 | 3.4 | 0.5 | 0.5 |

The level of lactose in the yoghurt samples show that Ha-lactase has highest activity in the beginning of the fermentation, during the first two hours of fermentation. After two hours Ha-lactase is clearly inactivated, due to the lowering of pH. The Bifidobacterium lactase, on the other hand, stays active during the whole fermentation and also to some extent during cold storage. At the lowest tested dosage of 710 LAU/L, the lactose level is significantly reduced during cold storage when using the Bifidobacterium lactase.

Example 7

Yoghurt Trials

Commercial homogenized milk with 1.5% fat was pasteurized at 90° C. for 20 min. 200 ml of the milk was transferred into baby bottles and tempered to 43° C. The milk was inoculated with a frozen probiotic yoghurt culture from Chr. Hansen, Denmark, (F-DVS ABY-3) using an inoculation level if 0.02%. At the same time enzyme was added to the milk. Enzyme products tested were Ha-lactase, a commercially available lactase from Chr. Hansen, Denmark, having an activity of 8021 LAU/g and an experimental lactase from Bifidobacterium bifidum having the encoded sequence shown in SEQ ID NO: 2 and an activity of 295 LAU/g.

Dosage was 1500 LAU/L milk of Ha-lactase and 710, 530 and 360 LAU/L of the Bifidobacterium lactase. The milk samples were fermented at 43° C. until pH reached 4.55 within approximately five hours. The yoghurts were then stirred, cooled to 25° C. and placed at 8° C. for storage. Samples were collected 2 hours after addition of culture and enzyme, at end pH (pH4.55) and after 1, 2, 3 and 7 days of storage at 8° C. The biological activity was stopped by addition of sulphuric acid. Proteins were precipitated adding perchloric acid and MQW containing standards was then added.

Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 7

Lactose (mg/g)

| Time | No lactase | Ha-lactase 1500 LAU/L | Bifidobacterium lactase | | |
|---|---|---|---|---|---|
| | | | 710 LAU/L | 530 LAU/L | 360 LAU/L |
| Initial | 47.9 | | | | |
| 2 h | 45.8 | 4.7 | 21.2 | 24.2 | 29.6 |
| End pH | 35.5 | 2.3 | 0.8 | 3.8 | 9.6 |
| Day 1 | 33.7 | 3.1 | 0.2 | 0.8 | 4.7 |
| Day 2 | | 2.7 | 0.5 | 0.7 | 2.9 |
| Day 3 | | 2.6 | 0.3 | 0.2 | 1.5 |
| Day 7 | | 2.6 | 0.1 | 0.2 | 0.3 |

As described in the previous example, the activity period of the two enzymes tested differs. Ha-lactase shows high activity at the start of fermentation whereas the Bifidobacterium lactase stays active during the whole fermentation time and also during cold storage. Hence, after two days of storage the lactose level is similar or lower in samples with the Bifidobacterium lactase compared to the Ha-lactase.

Similar degrees of lactose hydrolysis are obtained day 2 in the yoghurts samples with 1500 LAU/L Ha-lactase and yoghurt samples with 360 LAU/L Bifidobacterium lactase.

Example 8

Milk Trials

Commercial homogenized milk with 1.5% fat was transferred to tubes (10 ml) and heated in water baths to 40° C., 50° C. and 55° C., respectively. Enzyme was then added to the milk samples. Enzyme products tested were Ha-lactase, a commercially available lactase from Chr. Hansen, Denmark, having an activity of 8040 LAU/g and an experimental lactase from Bifidobacterium bifidum having the encoded sequence shown in SEQ ID No. 2 and an activity of 295 LAU/g.

Dosage was 1500 LAU/L milk of Ha-lactase and 710 LAU/L of the Bifidobacterium lactase. Samples were collected 2 hours and 4 hours after addition of the enzyme. The biological activity was stopped by addition of sulphuric acid. Proteins were precipitated adding perchloric acid and MQW containing standards was then added.

Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 8

Lactose (mg/g)

| Time | Reference No lactase | HA-lactase - 1500 LAU/L | | | Bifidobacterium lactase - 710 LAU/L | | |
|---|---|---|---|---|---|---|---|
| | | 40° C. | 50° C. | 55° C. | 40° C. | 50° C. | 55° C. |
| 2 h | 46.5 | 24.0 | 34.9 | 40.6 | 29.3 | 21.0 | 31.7 |
| 4 h | 46.5 | 19.8 | 37.3 | 39.6 | 12.5 | 11.2 | 25.6 |

At the highest temperatures, 50° C. and 55° C., the Bifidobacterium lactase shows significantly higher activity compared to the Ha-lactase. Furthermore, the Bifidobacte-

*rium* lactase stays active during the 4 hour reaction time, whereas no or only very low activity is observed for the Ha-lactase.

Example 9

Milk Trials—High Temperature

Commercial homogenized milk with 1.5% fat was transferred to tubes (10 ml) and tempered to 63° C. Enzyme was added to the milk samples. Enzyme products tested were Ha-lactase 5200, a commercially available lactase from Chr. Hansen (Denmark) having an activity of 8040 LAU/g and Lactoles, a commercial *Bacillus* lactase from Daiwa Kasei (Japan) having an activity of approximately 1500 LAU/g.

Applied dosages were 1500 LAU/L milk of Ha-lactase and Lactoles, respectively. At 63° C. samples were collected 15 minutes, 30 minutes, 2 hours and 4 hours after addition of the enzyme. The enzymatic activity in the samples was stopped by addition of sulphuric acid and proteins precipitated by addition of perchloric acid before HPLC analysis. Lactose hydrolysis was measured using a Dionex ICS-3000 system equipped with a Carbopac20 connected with an electrochemical detector (ED). Peaks were identified and quantified by comparing with known standards of lactose, glucose and galactose. Results for lactose hydrolysis are given below.

TABLE 9

| | Lactose (mg/g) | | |
|---|---|---|---|
| Time | Reference-No lactase | HA-lactase 5200-1500 LAU/L | Lactoles-1500 LAU/L |
| 15 min. | 48.9 | 44.6 | 22.7 |
| 30 min. | 48.9 | 44.9 | 22.1 |
| 2 h | 48.9 | 44.0 | 6.7 |
| 4 h | 48.9 | 43.2 | 3.2 |

At 63° C., Ha-lactase 5200 is inactivated as no hydrolysis takes place during 4 hours of reaction. On the other hand, Lactoles shows high activity at this temperature during the whole reaction time. After 4 hours, a degree of hydrolysis of 93.4% is obtained.

Example 10

100 ml 9% skimmed milk solution having approximately 5% lactose was made by mixing 9 g skimmed milk powder (Kerry) in 91 ml ionic water. 10 ml of the solution was transferred to a test tube containing a magnetic stirring bar and placed in a water bath at 5° C. After 15 min enzyme was added. Enzymes tested were Lactozym, a commercially available lactase from Novozymes A/S, Denmark, having an activity of 3060 LAU/g, and an experimental lactase from *Bifidobacterium bifidum* having the encoded sequence shown in SEQ ID NO: 2 and an activity of 295 LAU/g. Amino acids 1 to 27 of SEQ ID NO: 2 is a signal sequence which is presumably cleaved off and amino acids 1332 to 1341 is a tag used for purification of the experimental enzyme.

Dosages were 3000 LAU/l milk of Lactozym and 1420 LAU/l milk of the *Bifidobacterium* lactase. Milk samples were taken at regular intervals up till 48 hrs. and the enzyme inactivated by heating to 99° C. for 10 min in a thermomixer. Samples were diluted appropriately and filtered through a 0.20 um filter.

Lactose hydrolysis was measured using a Dionex BioLC equipped with a Dionex PA1 column and a Pulsed Amperiometrisk Detektor (PAD). Peaks were identified and quantified by comparing with known standards of lactose, glucose and galactose. Results are given below.

TABLE 10

Lactose, glucose and galactose in reconstituted skimmed milk after treatment with Lactozym or *Bifidobacterium* lactase at 5° C.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 125 | — | — | — | 110 | 28 | 31 |
| 240 | 87 | 64 | 60 | — | — | — |
| 360 | — | — | — | 70 | 65 | 67 |
| 460 | 62 | 104 | 91 | 55 | 74 | 76 |
| 1410 | 18 | 152 | 134 | 13 | 149 | 148 |
| 1620 | 13 | 137 | 125 | 7 | 139 | 140 |
| 1865 | 10 | — | — | 5 | 167 | 167 |
| 2870 | 6 | 141 | 132 | 0.7 | 139 | 140 |

When tested in milk with 5% lactose at 5° C. again no transferase activity is observed when using the *Bifidobacterium* lactase. Glucose and galactose production are equal and total monosaccharide production match that expected from the lactose hydrolyzed. For comparison, Lactozym produces less galactose than glucose clearly showing that galactooligosaccharides have been produced. Also, final lactose levels are significantly lower when using the *Bifidobacterium* lactase further illustrating the lower Km value of this enzyme.

The invention claimed is:

1. A polypeptide having lactase activity, wherein the polypeptide is at least 90 percent identical to amino acids 28-1331 of SEQ ID NO: 2 having lactase activity, wherein the polypeptide is isolated.

2. The polypeptide of claim 1, wherein the polypeptide is at least 95 percent identical to amino acids 28-1331 of SEQ ID NO: 2 having lactase activity.

3. The polypeptide of claim 1, wherein the polypeptide is at least 98 percent identical to amino acids 28-1331 of SEQ ID NO: 2 having lactase activity.

4. The polypeptide of claim 1, wherein the polypeptide is at least 90 percent identical to amino acids 28-1331 of SEQ ID NO: 2 and consists of 1304 amino acids.

5. The polypeptide of claim 1, wherein the polypeptide has a ratio of lactase to transgalactosylase activity of more than 1:1 when hydrolysing lactose in a milk-based substrate.

6. A composition comprising the polypeptide of claim 1.

7. The composition of claim 6, wherein the composition further comprises a milk-based substrate.

8. The composition of claim 7, wherein the milk-based substrate comprises lactose.

9. The composition of claim 6, wherein the composition is a dairy product.

10. The composition of claim 9, wherein the dairy product is a fermented dairy product.

11. The composition of 10, wherein the dairy product is yoghurt.

12. A method for producing a food product, comprising treating a milk-based substrate comprising lactose with the polypeptide of claim 1.

13. A method for producing a dairy product, comprising treating a milk-based substrate comprising lactose with the polypeptide of claim 1.

14. The polypeptide of claim 1, wherein the polypeptide is at least 99 percent identical to amino acids 28-1331 of SEQ ID NO: 2 having lactase activity.

15. The polypeptide of claim 1, wherein the first amino acid in the sequence is isoleucine.

16. The polypeptide of claim 1, wherein the second amino acid in the sequence is glutamate.

17. The polypeptide of claim 1, wherein the third amino acid in the sequence is aspartate.

18. The polypeptide of claim 1, wherein the fourth amino acid in the sequence is alanine.

19. The polypeptide of claim 1, wherein the fifth amino acid in the sequence is threonine.

20. The polypeptide of claim 1, wherein the sixth amino acid in the sequence is arginine.

* * * * *